US007724655B2

(12) United States Patent
Saleh et al.

(10) Patent No.: US 7,724,655 B2
(45) Date of Patent: May 25, 2010

(54) NETWORK ADDRESSING SCHEME FOR REDUCING PROTOCOL OVERHEAD IN AN OPTICAL NETWORK

(75) Inventors: Ali Najib Saleh, Addison, TX (US); Stevan E. Plote, Plano, TX (US)

(73) Assignee: Cisco Systems, Inc., San Jose, CA (US)

( * ) Notice: Subject to any disclaimer, the term of this patent is extended or adjusted under 35 U.S.C. 154(b) by 988 days.

(21) Appl. No.: 10/958,901

(22) Filed: Oct. 5, 2004

(65) Prior Publication Data

US 2005/0047327 A1    Mar. 3, 2005

(51) Int. Cl.
*H04J 1/16*    (2006.01)
(52) U.S. Cl. ........................................ 370/228; 370/242
(58) Field of Classification Search .................. 370/216, 370/217, 221, 228, 241, 242, 252, 254
See application file for complete search history.

(56) References Cited

U.S. PATENT DOCUMENTS

| | | | | |
|---|---|---|---|---|
| 5,065,399 A | | 11/1991 | Hasegawa et al. ............... 714/4 |
| 5,748,611 A | | 5/1998 | Allen et al. .................. 370/221 |
| 6,097,696 A | * | 8/2000 | Doverspike ................. 370/216 |
| 6,115,753 A | * | 9/2000 | Joens .......................... 709/242 |
| 6,163,525 A | | 12/2000 | Bentall et al. ................ 370/227 |
| 6,167,025 A | | 12/2000 | Hsing et al. .................. 370/216 |
| 6,222,820 B1 | * | 4/2001 | Hamami ...................... 370/218 |
| 6,282,170 B1 | | 8/2001 | Bentall et al. ................ 370/225 |
| 6,324,162 B1 | | 11/2001 | Chaudhuri ................... 370/225 |
| 6,333,918 B1 | * | 12/2001 | Hummel ...................... 370/238 |
| 6,512,740 B1 | * | 1/2003 | Baniewicz et al. ........... 370/216 |
| 6,598,092 B2 | * | 7/2003 | Tomizawa et al. ............ 709/251 |
| 6,714,549 B1 | * | 3/2004 | Phaltankar .................. 370/397 |
| 6,801,496 B1 | * | 10/2004 | Saleh et al. .................. 370/221 |

* cited by examiner

*Primary Examiner*—Ricky Ngo
*Assistant Examiner*—Kan Yuen
(74) *Attorney, Agent, or Firm*—Campbell Stephenson LLP

(57) ABSTRACT

A method for operating a network and a network architecture implementing the method are described. The method, in one embodiment, begins by grouping a plurality of nodes into zones, where the network includes the plurality of nodes. At least one of the nodes in each one of the zones is one of a plurality of boundary nodes, and each of the boundary nodes in each one of the zones is coupled to a boundary node in another of the zones by one of a first number of inter-zone optical links. One of the zones includes a number of nodes, each of which is coupled to at least one other of the nodes by one of a second number of intra-zone optical links. Next, a non-boundary node is configured to transmit network information to other of the nodes. The non-boundary node is a node in the zone that is not a boundary node. Finally, a boundary node in the zone is configured to limit transmission of the network information through itself to other of the boundary nodes. The network information so limited can be restoration information (in the event of a failure), network topology information, and/or other network information.

20 Claims, 18 Drawing Sheets

NETWORK ADDRESSING SCHEME FOR REDUCING PROTOCOL OVERHEAD IN AN OPTICAL NETWORK

CROSS-REFERENCES TO RELATED APPLICATIONS

This application is a continuation-in-part of patent application Ser. No. 09/232,397, filed Jan. 15, 1999 and entitled "A METHOD FOR ROUTING INFORMATION OVER A NETWORK," having A. N. Saleh, H. M. Zadikian, Z. Baghdasarian, and V. Parsi as inventors. This application is assigned to Monterey Networks, Inc., the assignee of the present invention, and is hereby incorporated by reference, in its entirety and for all purposes.

This invention also claims priority from a provisional application entitled "A NETWORK ADDRESSING SCHEME FOR REDUCING PROTOCOL OVERHEAD IN AN OPTICAL NETWORK" (U.S. Provisional Application No. Ser. No. 60/137,472), filed Jun. 4, 1999, having S. N. Ali and S. E. Plote as inventors, which is hereby incorporated by reference, in its entirety and for all purposes.

This application is related to patent application Ser. No. 09/232,395, filed Jan. 15, 1999 and entitled "A CONFIGURABLE NETWORK ROUTER," having H. M. Zadikian, A. N. Saleh, J. C. Adler, Z. Baghdasarian, and V. Parsi as inventors. This related application is assigned to Monterey Networks, Inc., the assignee of the present invention, and is hereby incorporated by reference, in its entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

SUMMARY

In one embodiment, the present invention reduces the time and resources required to restore a failed circuit (or provision a new circuit) in an optical network by partitioning the nodes of an optical network into zones. The time and resources required are reduced, for example, by localizing the required actions to the zone in which the failure occurred. Localization is effected through the use of a node that acts as a substitute for the source or destination node, as the case may be. This substitute node is referred to herein as a proxy node. The proxy node will normally be a boundary node for the zone in which no failure occurred. If a failure occurs between zones, both boundary nodes can act as proxies for their respective non-boundary nodes, or a full restoration may instead be performed.

According to one embodiment of the present invention, a method is provided for operating a network. The method, in one embodiment, begins by grouping a plurality of nodes into zones, where the network includes the plurality of nodes. At least one of the nodes in each one of the zones is one of a plurality of boundary nodes, and each of the boundary nodes in each one of the zones is coupled to a boundary node in another of the zones by one of a first number of inter-zone optical links. One of the zones includes a number of nodes, each of which is coupled to at least one other of the nodes by one of a second number of intra-zone optical links. Next, a non-boundary node is configured to transmit network information to other of the nodes. The non-boundary node is a node in the zone that is not a boundary node. Finally, a boundary node in the zone is configured to limit transmission of the network information through itself to other of the boundary nodes. The network information so limited can be restoration information (in the event of a failure), network topology information, and/or other network information.

According to another embodiment of the present invention, a network includes a plurality of nodes, a plurality of inter-zone optical links, and a plurality of intra-zone optical links. The nodes are grouped into zones, and each one of the zones includes at least a first number of the nodes, at least one of which is a boundary node. A boundary node in each one of the zones is coupled to a boundary node in at least one of the other zones by at least one of the inter-zone optical links One of the zones includes a second number of nodes, which including a first boundary node and a first non-boundary node. The first non-boundary node is one of the second number of the nodes that is not the first boundary node, and each one of the second number of nodes is coupled to at least one other of those nodes by at least one of the intra-zone optical links. The non-boundary node is configured to transmit network information to other of the nodes, while the first boundary node is configured to limit transmission of network information through itself to at least one other of the boundary nodes.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
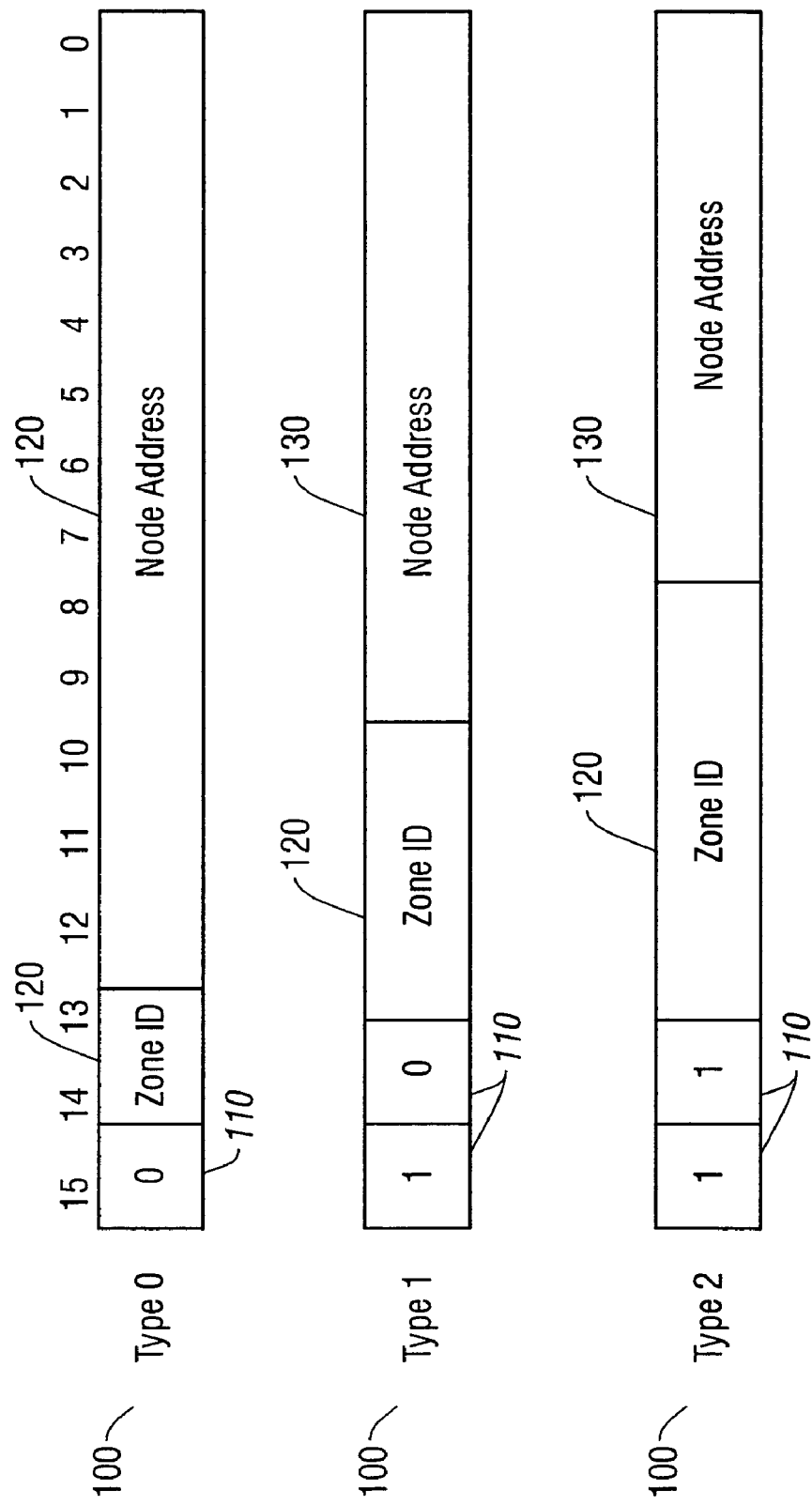
FIG. 1 illustrates the layout of a node identifier (node ID).

The following is intended to provide a detailed description of an example of the invention and should not be taken to be limiting of the invention itself. Rather, any number of variations may fall within the scope of the invention which is defined in the claims following the description.

In one embodiment, a network architecture is described that provides many advantages, including a reduction in protocol overhead experienced by the network, quicker provisioning and restoration of circuits, support for highly efficient protocols, and other advantages. These and other advantages are particularly important when an embodiment of the present invention is used in an optical telecommunications network (e.g., a network employing the Synchronous Optical Network (SONET) protocol, such as that described herein), due in part to the enhancement in restoration times and reduction in protocol overhead provided thereby.

Network Architecture

To limit the size of the topology database used by some protocols, and to limit the scope of broadcast packets (e.g., those which may be used for restoration), the nodes of a network according to one embodiment of the present invention are divided into logical groups referred to herein as "zones." The use of zones provides several benefits, and can be implemented in several different ways, some of which can be implemented concurrently.

For example, the zone boundaries can be used to limit the flow of topological information. Each zone can be configured to run a separate copy of the topology distribution process, and nodes within each zone are only required to maintain information about their own zone. There would then be no need for a zone's topology to be known outside its boundaries, and non-boundary nodes within a zone need not be aware of the network's topology external to their respective zones. As will be apparent to one of skill in the art, however, this need not hold true for all nodes in certain embodiments of the present invention.

Another example of the use of zone boundaries is in the provisioning and restoration of circuits within the network. Zone boundaries can be used to limit the flow of information generated by certain nodes during such provisioning and restoration. For example, a node can act as a proxy node for the source or destination node, in the event of a failure in the network affecting the circuit between the two nodes. In that case, a node at the boundary of the zone in which the failure has occurred acts as a proxy for the source (or destination) node in the other zone, avoiding the need to involve that portion of the circuit lying outside of the zone experiencing a failure, which would be expected to remain unchanged.

Nodes that attach to multiple zones are referred to herein as boundary nodes. Boundary nodes are required to maintain a separate topological database, also referred to herein as a link-state or connectivity database, for each of the zones to which they attach. Boundary nodes use the connectivity database(s) for intra-zone routing. Boundary nodes are also required to maintain a separate database that describes the connectivity of the zones themselves. This database, which is referred to herein as the network database, is used for inter-zone routing and describes the topology of a special zone, referred to herein as the backbone, which is normally assigned an ID of 0. The backbone has all the characteristics of a zone. There is no need for a backbone's topology to be known outside the backbone, and its boundary nodes need not be aware of the topologies of other zones.

A network is referred to herein as flat if the network consists of a single zone (i.e., zone 0 or the backbone zone). Conversely, a network is referred to herein as hierarchical if the network includes two or more zones, not including the backbone. The resulting multi-level hierarchy (i.e., nodes in multiple zones) provides the following benefits:

1. The size of the link state database maintained by each network node can be reduced, which allows a protocol using an embodiment of the present invention to scale well for large networks.

2. The scope of broadcast packets (regardless of their purpose) can be limited, reducing their impact on protocol overhead experienced by a network.

Broadcast packets can impact bandwidth, for example, by spawning offspring exponentially—the smaller scope results in a fewer number of hops and, therefore, less traffic.

The shorter average distance between nodes also results in a much faster restoration time, especially in large networks (which are more effectively divided into zones).

3. Different sections of a long route (i.e., one spanning multiple zones) can be computed separately and in parallel, speeding the calculations. Such calculations can also be limited to one zone, in certain cases (e.g., a failure entirely within one zone).

4. Restricting routing to be within a zone prevents database corruption in one zone from affecting the intra-zone routing capability of other zones because routing within a zone is based solely on information maintained within the zone.

5. Restricting routing to be within a zone also limits the amount of bandwidth consumed by the transmission of restoration messages.

As noted, the protocol routes information at two different levels: inter-zone and intra-zone. The former is only used when the source and destination nodes of a virtual path are located in different zones. Inter-zone routing supports path restoration on an end-to-end basis from the source of the virtual path to the destination by isolating failures between zones. In the latter case, the boundary nodes in each transit zone originate and terminate the path-restoration request on behalf of the virtual path's source and destination nodes. A boundary node that assumes the role of a source (or destination) node during the path restoration activity is referred to herein as a proxy source (destination) node. Such nodes are responsible for originating (terminating) the request for the restoration of a VP within their own zones. Proxy nodes are also required to communicate with boundary nodes in other zones to establish an inter-zone path for a VP.

In one embodiment, every node in a network employing the protocol is assigned a globally unique address, for example, a 16-bit ID (referred to herein as the node ID). A node ID may be divided into two parts, zone ID and node address, for example. Logically, each node ID is a pair (zone ID, node address), where the zone ID identifies a zone within the network, and the node address identifies a node within that zone. To minimize overhead, multiple node ID types may be defined, each with a different size zone ID field, for example. For example, three types of node IDs are defined in the zone architecture described herein, although a different number of zone types can be employed. The network provider selects which packet type to use based on the desired network architecture.

FIG. 1 illustrates the layout of a node ID 100 using three types of node IDs. As shown in FIG. 1, a field referred to herein as type ID 110 is allocated either one or two bits, a zone ID 120 of between 2-6 bits in length, and a node address 130 of between about 8-13 bits in length. Type 0 IDs allocate 2 bits to zone ID and 13 bits to node address, which allows up to $2^{13}$ or 8192 nodes per zone. As shown in FIG. 1, type 1 IDs devote 4 bits to zone ID and 10 bits to node address, which allows up to $2^{10}$ (i.e. 1024) nodes to be placed in each zone. Finally, type 2 IDs use a 6-bit zone ID and an 8-bit node address, as shown in FIG. 1. This allows up to 256 nodes to be addressed within the zone. It will be obvious to one skilled in the art that the node ID bits can be apportioned in several other ways to provide more levels of addressing.

Type 0 IDs work well for networks that contain a small number of large zones (e.g., less than about 4 zones). Type 2 IDs are well suited for networks that contain a large number of small zones (e.g., more than about 15 zones). Type 1 IDs provide a good compromise between zone size and number of available zones, which makes a type 1 node ID a good choice for networks that contain an average number of medium size zones (e.g., between about 4 and about 15 zones). When zones being described herein are used in a network, the node IDs of the nodes in a zone may be delineated as two decimal numbers separated by a period (e.g., ZoneID.NodeAddress).

Figure 2:
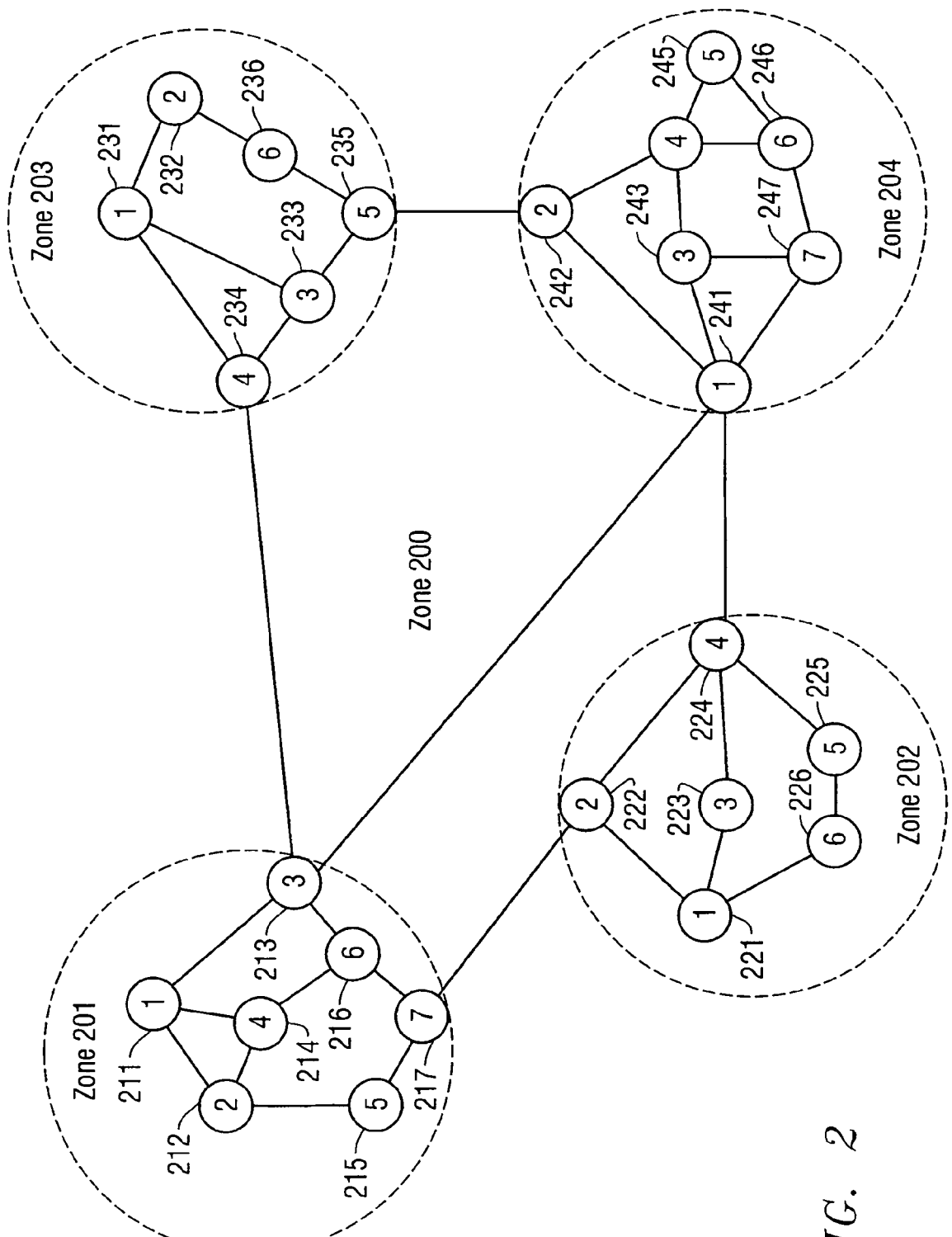
FIG. 2 is a block diagram of a zoned network.

FIG. 2 illustrates an exemplary network that has been organized into a backbone, zone 200, and four configured zones, zones 201-204, which are numbered 0-4 under the protocol, respectively. The exemplary network employs a type 0 node ID, as there are relatively few zones (4). The solid circles in each zone represent network nodes, while the numbers within the circles represent node addresses, and include network nodes 211-217, 221-226, 231-236, and 241-247. The dashed circles represent network zones. The network depicted in FIG. 2 has four configured zones (zones 201-204 (addressed as zones 1-4) and one backbone (zone 200 (addressed as zone 0)). Nodes with node IDs 1.3, 1.7, 2.2, 2.4, 3.4, 3.5, 4.1, and 4.2 (network nodes 213, 217, 222, 224, 234, 235, 241, and 242, respectively) are boundary nodes because they connect to more than one zone. All other nodes are interior nodes because their links attach only to nodes within the same zone. Zone 200 consists of 4 nodes, zones 201-204, with node IDs of 0.1, 0.2, 0.3, and 0.4, respectively.

Initialization of Network Nodes

Once a network topology has been defined, the protocol described herein allows the user to configure one or more end-to-end connections that can span multiple nodes and zones, an operation is referred to herein as provisioning. Each set of physical connections that are provisioned creates an end-to-end connection between the two end nodes that supports a virtual point-to-point link (referred to herein as a virtual path or VP). The resulting VP has an associated capacity and an operational state, among other attributes. The end points of a VP can be configured to have a master/slave relationship. The terms source and destination are also used herein in referring to the two end-nodes. In such a relationship, the node with a numerically lower node ID assumes the role of the master (or source) node, while the other assumes the role of the slave (or destination) node. The protocol defines a convention in which the source node assumes all recovery responsibilities and the destination node simply waits for a message from the source node informing the destination node of the VP's new path, although the opposite convention or another paradigm could easily be employed.

VPs are also assigned a priority level, which determines their relative priority within the network. This quality of service (QoS) parameter is used during failure recovery procedures to determine which VPs are first to be restored. Four QoS levels (0-3) are nominally defined in the protocol, with 0 being the lowest, although a larger or smaller number of QoS levels can be used. Provisioning is discussed in greater detail subsequently herein.

Network nodes can use a protocol such as that referred to herein as the Hello Protocol in order to establish and maintain neighbor relationships, and to learn and distribute link-state information throughout the network. The protocol relies on the periodic exchange of bi-directional packets (Hello packets) between neighbors. During the adjacency establishment phase of the protocol, which involves the exchange of INIT packets, nodes learn information about their neighbors, such as that listed in Table 1.

TABLE 1

Information regarding neighbors stored by a node.

| Parameter | Usage |
| --- | --- |
| Node ID | Node ID of the sending node, which is preferably, from 8 bits to 32 bits. |
| HelloInterval | How often Hello packets should be sent by the receiving node. |

TABLE 1-continued

Information regarding neighbors stored by a node.

| Parameter | Usage |
| --- | --- |
| HelloDeadInterval | The time interval, in seconds, after which the sending node will consider its neighbor dead if a valid Hello packets is not received. |
| LinkCost | Cost of the link between the two neighbors. This may represent distance, delay or any other metric. |
| LinkCapacity | Total link capacity. |
| QoS3Capacity | Link capacity reserved for QoS 3 connections. |
| QoSnCapacity | Link capacity reserved for QoS 0-2 connections. |

During normal protocol operation, each node constructs a structure known as a Link State Advertisement (LSA), which contains a list of the node's neighbors, links, the capacity of those links, the quality of service available on over links, one or more costs associated with each of the links, and other pertinent information. The node that constructs the LSA is referred to herein as the originating node. Normally, the originating node is the only node allowed to modify its contents (except for the HOP_COUNT field, which is not included in the checksum and so may be modified by other nodes). The originating node retransmits the LSA when the LSA's contents change. The LSA is sent in a special Hello packet that contains not only the originating node's own LSA in its advertisement, but also ones received from other nodes. Each node stores the most recently generated instance of an LSA in the node's link state database. The list of stored LSAs gives the node a complete topological map of the network. The topology database maintained by a given node is, therefore, nothing more than a list of the most recent LSAs generated by its peers and received in Hello packets.

In the case of a stable network, the majority of transmitted Hello packets are empty (i.e., contain no topology information) because only altered LSAs are included in the Hello messages. Packets containing no changes (no LSAs) are referred to herein as null Hello packets. The Hello protocol requires neighbors to exchange null Hello packets periodically. The HelloInterval parameter defines the duration of this period. Such packets ensure that the two neighbors are alive, and that the link that connects them is operational.

Initialization Message

An INIT message is the first protocol transaction conducted between adjacent nodes and is performed upon network startup or when a node is added to a pre-existing network. An INIT message is used by adjacent nodes to initialize and exchange adjacency parameters. The packet contains parameters that identify the neighbor (the node ID of the sending node), link bandwidth (both total and available, on a QoS3/QoSn basis), and configured Hello protocol parameters. The structure, field definitions, and related information are illustrated subsequently in FIG. 17 and described in the text corresponding thereto.

In systems that provide two or more QoS levels, varying amounts of link bandwidth may be set aside for the exclusive use of services requiring a given QoS. For example, a certain amount of link bandwidth may be reserved for QoS3 connections. This guarantees that a given amount of link bandwidth will be available for use by these high-priority services. The remaining link bandwidth would then be available for use by all QoS levels (0-3). The Hello parameters include the HelloInterval and HelloDeadInterval parameters. The HelloInterval is the number of seconds between transmissions of Hello packets. A zero in this field indicates that this parameter hasn't been configured on the sending node and that the neighbor should use its own configured interval. If both nodes send a zero in this field, then a default value (e.g., 5 seconds) should be used. The HelloDeadInterval is the number of seconds the sending node will wait before declaring a silent neighbor down. A zero in this field indicates that this parameter hasn't been configured on the sending node and that the neighbor should use its own configured value. If both nodes send a zero in this field, then a default value (e.g., 30 seconds) should be used. The successful receipt and processing of an INIT packet causes a START event to be sent to the Hello State machine, as is described subsequently.

Hello Message

Once adjacency between two neighbors has been established, the nodes periodically exchange Hello packets. The interval between these transmissions is a configurable parameter that can be different for each link, and for each direction. Nodes are expected to use the HelloInterval parameters specified in their neighbor's Hello message. A neighbor is considered dead if no Hello message is received from the neighbor within the HelloDeadInterval period (also a configurable parameter that can be link-blank and direction-specific).

In one embodiment, nodes in a network continuously receive Hello messages on each of their links and save the most recent LSAs from each message. Each LSA contains, among other things, an LSID (indicating which instance of the given LSA has been received) and a HOP_COUNT. The HOP_COUNT specifies the distance, as a number of hops, between the originating node and the receiving node. The originating node always sets this field of 0 when the LSA is created. The HOP_COUNT field is incremented by one for each hop (from node to node) traversed by the LSA instance. The HOP_COUNT field is set to zero by the originating node and is incremented by one on every hop of the flooding procedure. The ID field is initialized to FIRST_LSID during node start-up and is incremented every time a new instance of the LSA is created by the originating node. The initial ID is only used once by each originating node. Preferably, an LSA carrying such an ID is always accepted as most recent. This approach allows old instances of an LSA to be quickly flushed from the network when the originating node is restarted.

During normal network operation, the originating node of an LSA transmits LS update messages when the node detects activity that results in a change in the node's LSA. The node sets the HOP_COUNT field of the LSA to 0 and the LSID field to the LSID of the previous instance plus 1. Wraparound may be avoided by using a sufficiently-large LSID (e.g., 32 bits). When another node receives the update message, the node records the LSA in the node's link state database and schedules the LSA for transmission to the node's own neighbors. The HOP_COUNT field is incremented by one and transmitted to the neighboring nodes. Likewise, when the nodes downstream of the current node receive an update message with a HOP_COUNT of H, they transmit their own update message to all of their neighbors with a HOP_COUNT of H+1, which represents the distance (in hops) to the originating node. This continues until the update message either reaches a node that has a newer instance of the LSA in its database or the hop-count field reaches MAX_HOPS.

Figure 3:
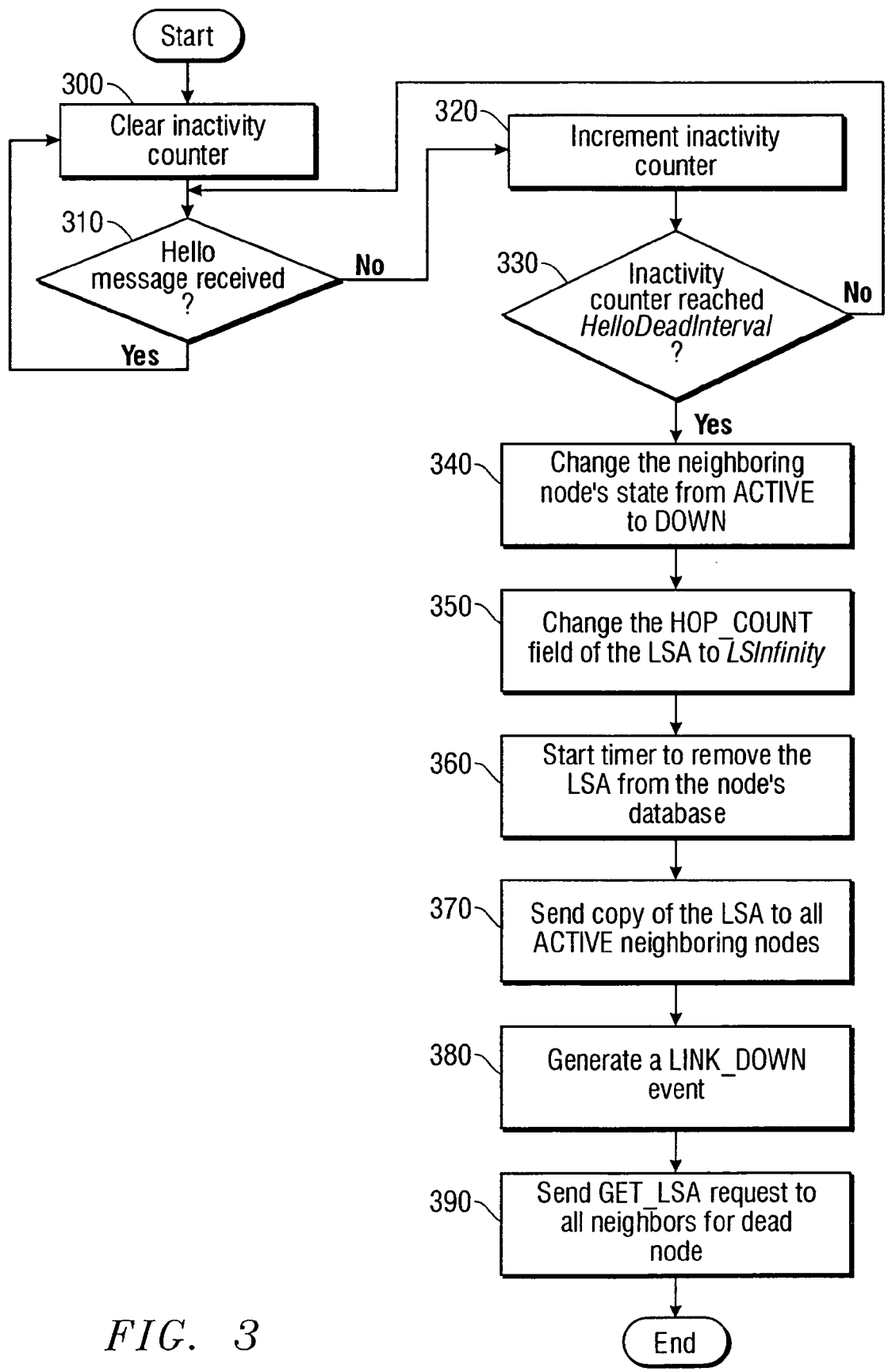
FIG. 3 is a flow diagram illustrating the actions performed by a neighboring node in the event of a failure.

FIG. 3 is a flow diagram illustrating the actions performed in the event of a failure. When the connection is created, the inactivity counter associated with the neighboring node is cleared (step 300). When a node receives a Hello message (null or otherwise) from a neighboring node (step 310), the receiving node clears the inactivity counter (step 300). If the neighboring node fails, or any component along the path between the node and the neighboring node fails, the receiving node stops receiving update messages from the neighboring node. This causes the inactivity counter to increase gradually (step 320) until the counter reaches HelloDeadInterval (step 330). Once HelloDeadInterval is reached, several actions are taken. First, the node changes the state of the neighboring node from ACTIVE to DOWN (step 340). Next, the HOP_COUNT field of the LSA is set to LSInfinity (step 350). A timer is then started to remove the LSA from the node's link state database within LSZombieTime (step 360). A copy of the LSA is then sent to all active neighbors (step 370). Next, a LINK_DOWN event is generated to cause all VP's that use the link between the node and its neighbor to be restored (step 380). Finally, a GET_LSA request is sent to all neighbors, requesting their copy of all LSA's previously received from the now-dead neighbor (step 390).

It should be noted that those skilled in the art will recognize the boundaries between and order of operations in this and the other flow diagrams described herein are merely illustrative and alternative embodiments may merge operations, impose an alternative decomposition of functionality of operations, or re-order the operations presented therein. For example, the operations discussed herein may be decomposed into sub-operations to be executed as multiple computer processes. Moreover, alternative embodiments may combine multiple instances of particular operation or sub-operations. Furthermore, those skilled in the art will recognize that the operations described in this exemplary embodiment are for illustration only. Operations may be combined or the functionality of the operations may be distributed in additional operations in accordance with the invention.

Figure 4:
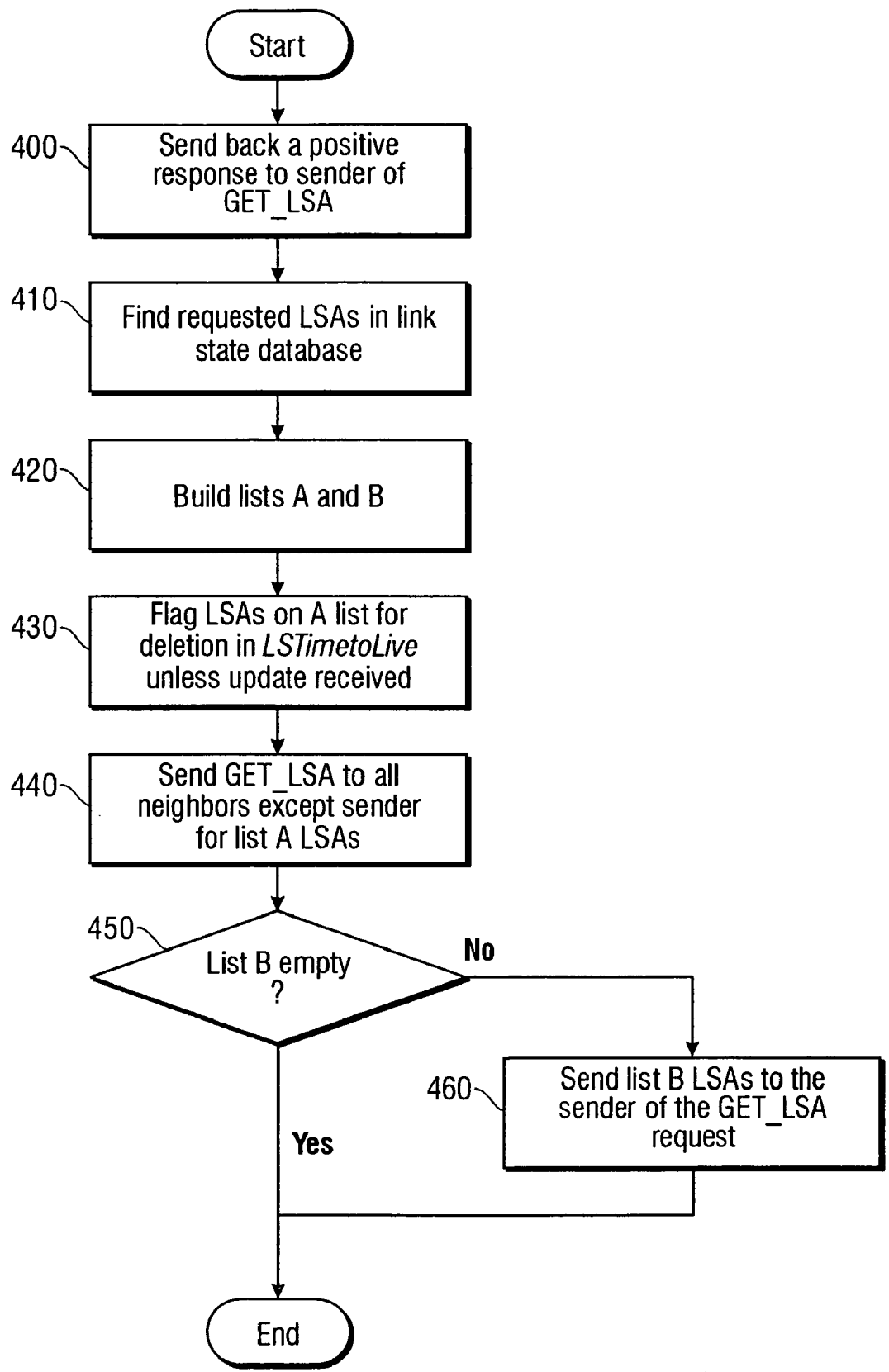
FIG. 4 is a flow diagram illustrating the actions performed by a node in the event of a failure.

FIG. 4 is a flow diagram illustrating the actions performed when a downstream node receives a GET_LSA message. When the downstream node receives the request, the downstream node first acknowledges the request by sending back a positive response to the sending node (step 400). The downstream node then looks up the requested LSA's in the node's link state database (step 410) and builds two lists, list A and list B (step 420). The first list, list A, contains entries that were received from the sender of the GET_LSA request. The second list, list B, contains entries that were received from a node other than the sender of the request, and so need to be forwarded to the sender of the GET_LSA message. All entries on list A are flagged to be deleted within LSTimeToLive, unless an update is received from neighboring nodes prior to that time (step 430). The downstream node also sends a GET_LSA request to all neighbors, except the one from which the GET_LSA message was received, requesting each neighbor's version of the LSAs on list A (step 430). If list B is non-empty (step 450), entries on list B are placed in one or more Hello packets and sent to the sender of the GET_LSA message (step 460). No such request is generated if the list is empty (step 450).

The LSA of the inactive node propagates throughout the network until the hop-count reaches MAX_HOPS. Various versions of the GET_LSA request are generated by nodes along the path, each with a varying number of requested LSA entries. An entry is removed from the request when the request reaches a node that has an instance of the requested LSA that meets the criteria of list B.

All database exchanges are expected to be reliable using the above method because received LSA's must be individually acknowledged. The acknowledgment packet contains a mask that has a "1" in all bit positions that correspond to LSA's that were received without any errors. The low-order bit corresponds to the first LSA received in the request, while the high-order bit corresponds to the last LSA. Upon receiving the response, the sender verifies the checksum of all LSA's in its database that have a corresponding "0" bit in the response. The sender then retransmits all LSA's with a valid checksum and ages out all others. An incorrect checksum indicates that the contents of the given LSA has changed while being held in the node's database. This is usually the result of a memory problem. Each node is thus required to verify the checksum of all LSA's in its database periodically.

The LS checksum is provided to ensure the integrity of LSA contents. As noted, the LS checksum is used to detect data corruption of an LSA. This corruption can occur while the LSA is being transmitted, while the LSA is being held in a node's database, or at other points in the networking equipment. The checksum can be formed by any one of a number of methods known to those of skill in the art, such as by treating the LSA as a sequence of 16-bit integers, adding them together using one's complement arithmetic, and then taking the one's complement of the result. Preferably, the checksum doesn't include the LSA's HOP_COUNT field, in order to allow other nodes to modify the HOP_COUNT without having to update the checksum field. In such a scenario, only the originating node is allowed to modify the contents of an LSA except for those two fields, including its checksum. This simplifies the detection and tracking of data corruption.

Specific instances of an LSA are identified by the LSA's ID field, the LSID. The LSID makes it possible to detect old and duplicate LSAs. Similar to sequence numbers, the space created by the LSID is circular: the LSID starts at some value (FIRST_LSID), increases to some maximum value (FIRST_LSID−1), and then goes back to FIRST_LSID+1. Preferably, the initial value is only used once during the lifetime of the LSA, which helps flush old instances of the LSA quickly from the network when the originating node is restarted. Given a large enough LSID, wrap-around will never occur, in a practical sense. For example, using a 32 bit LSID and a MinLS-Interval of 5 seconds, wrap-around takes on the order of 680 years.

LSIDs must be such that two LSIDs can be compared and the greater (or lesser) of the two identified, or a failure of the comparison indicated. Given two LSIDs x and y, x is considered to be less than y if either $$|x-y|<2^{(LSIDLength-1)} \text{ and } x<y$$

or $$|x-y|>2^{(LSIDLength-1)} \text{ and } x>y$$

is true. The comparison fails if the two LSIDs differ by more than $2^{(LSIDLength-1)}$.

Sending, Receiving, and Verifying LSAs

Figure 5:
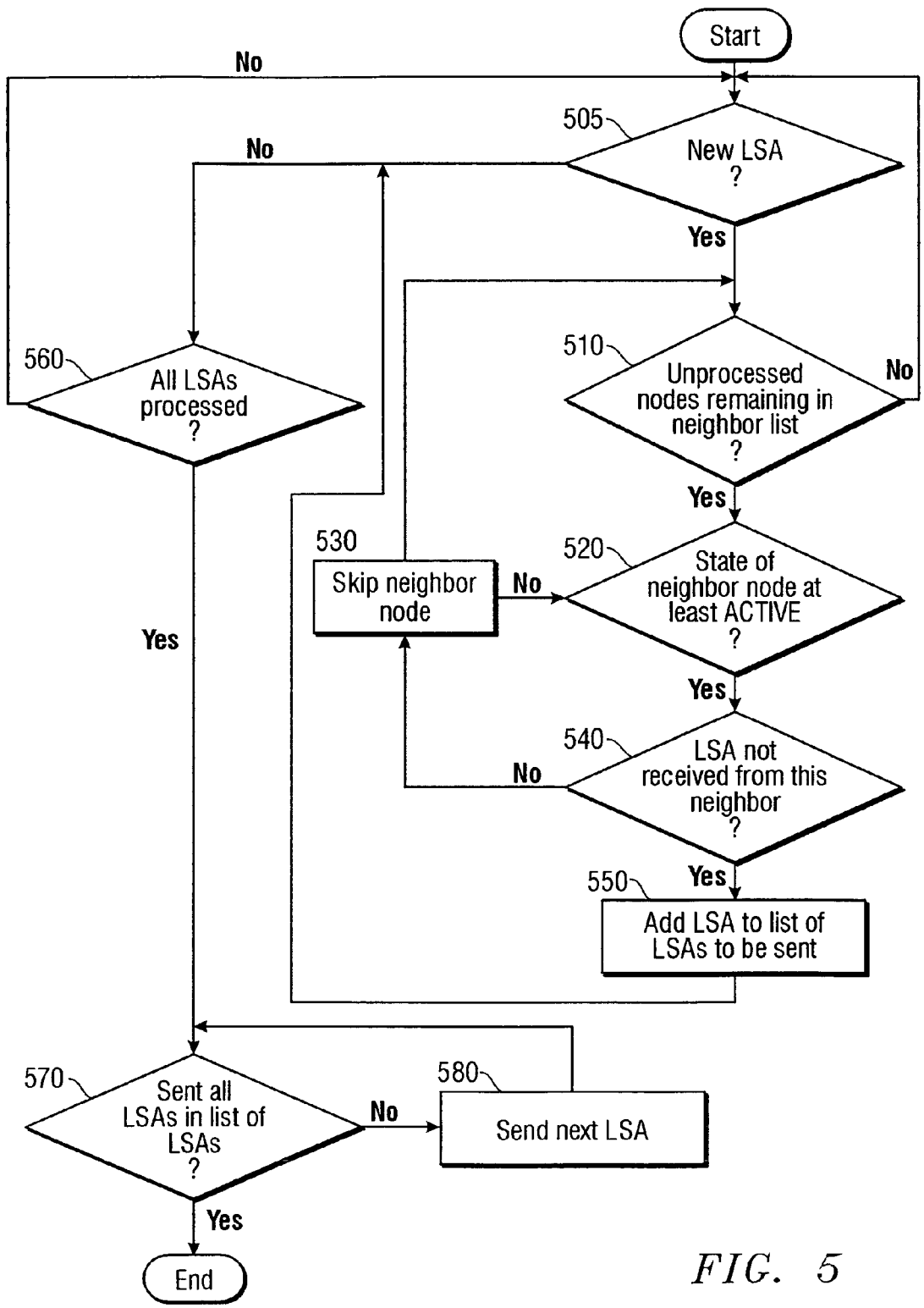
FIG. 5 is a flow diagram illustrating the actions performed in processing a Link State Advertisement (LSA).

FIG. 5 shows a flow diagram illustrating the actions performed in sending link state information using LSAs. As noted, each node is required to send a periodic Hello message on each of its active links. Such packets are usually empty (a null Hello packet), except when changes are made to the database, either through local actions or received advertisements. FIG. 5 illustrates how a given node decides which LSAs to send, when, and to what neighbors. It should be noted that each Hello message may contain several LSAs that are acknowledged as a group by sending back an appropriate response to the node sending the Hello message.

For each new LSA in the link state database (step 500), then, the following steps are taken. If the LSA is new, several actions are performed. For each node in the neighbor list (step 510), the state of the neighboring node is determined. If the state of the neighboring node is set to a value of less than ACTIVE, that node is skipped (steps 520 and 530). If the state of the neighboring node is set to a value of at least ACTIVE and if the LSA was received from this neighbor (step 540), the given neighbor is again skipped (step 530). If the LSA was not received from this neighbor (step 540), the LSA is added to the list of LSAs that are waiting to be sent by adding the LSA to this neighbor's LSAsToBeSent list (step 550). Once all LSAs have been processed (step 560), requests are sent out. This is accomplished by stepping through the list of LSAs to be sent (steps 570 and 580). Once all the LSAs have been sent, the process is complete.

Figure 6:
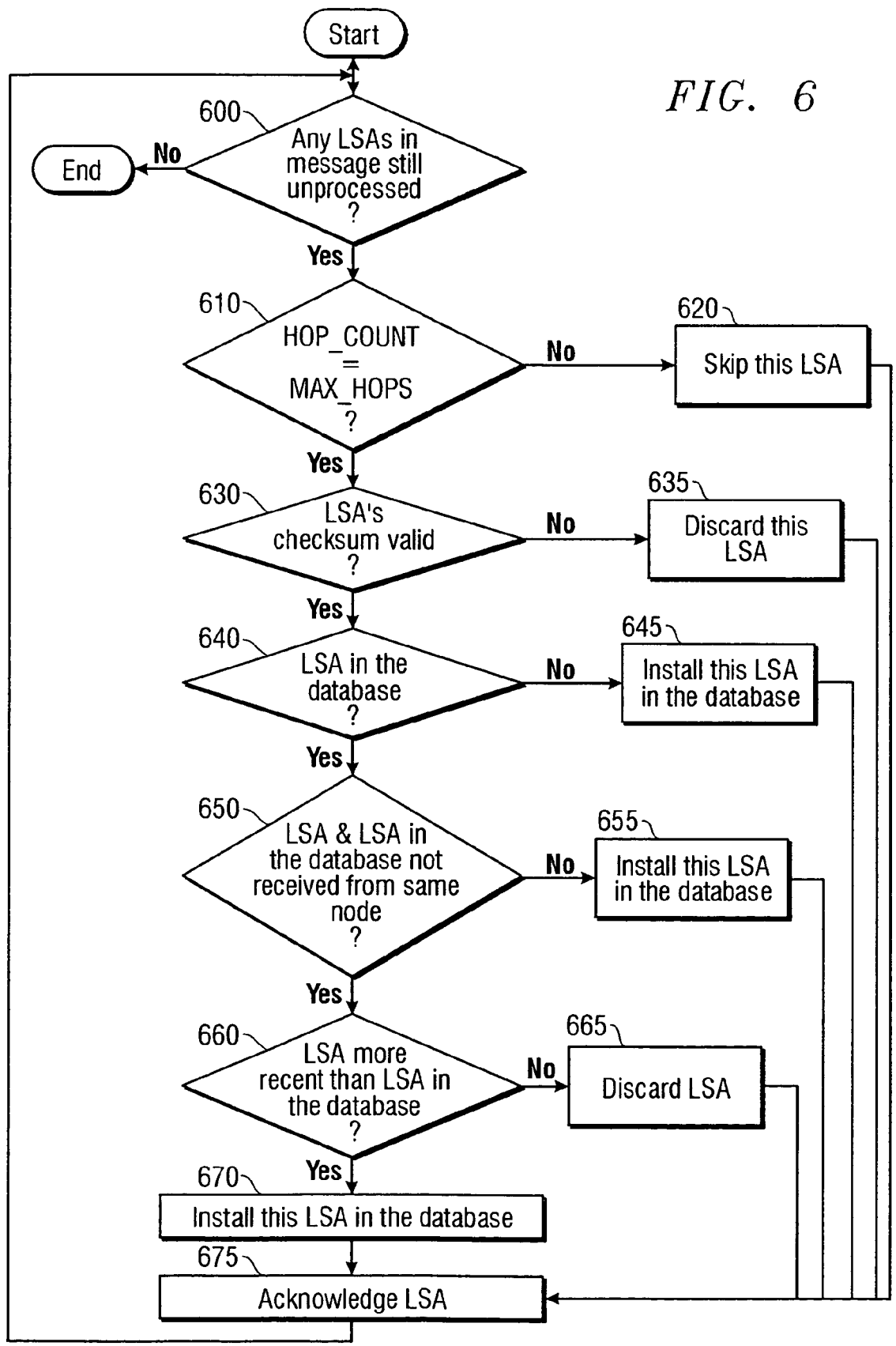
FIG. 6 is a flow diagram illustrating the actions performed in receiving an LSA.

FIG. 6 illustrates the steps performed by a node that is receiving LSAs. As noted, LSAs are received in Hello messages. Each Hello message may contain several distinct LSAs that must be acknowledged as a group by sending back an appropriate response to the node from which the Hello packet was received. The process begins at step 600, where a determination is made as to whether the received Hello message contains any LSAs requiring acknowledgment. An LSA requiring processing is first analyzed to determine if the HOP_COUNT is equal to MAX_HOPS (step 610). This indicates that HOP_COUNT was incremented past MAX_HOPS by a previous node, and implies that the originating node is too far from the receiving node to be useful. If this is the case, the current LSA is skipped (step 620). Next, the LSA's checksum is analyzed to ensure that the data in the LSA is valid (step 630). If the checksum is not valid (i.e., indicates an error), the LSA is discarded (step 435).

Otherwise, the node's link state database is searched to find the current LSA (step 640), and if not found, the current LSA is written into the database (step 645). If the current LSA is found in the link state database, the current LSA and the LSA in the database are compared to determine if they were sent from the same node (step 650). If the LSAs were from the same node, the LSA is installed in the database (step 655). If the LSAs were not from the same node, the current LSA is compared to the existing LSA to determine which of the two is more recent (step 660). The process for determining which of the two LSAs is more recent is discussed in detail below in reference to FIG. 7. If the LSA stored in the database is the more recent of the two, the LSA received is simply discarded (step 665). If the LSA in the database is less recent than the received LSA, the new LSA is installed in the database, overwriting the existing LSA (step 670). Regardless of the outcome of this analysis, the LSA is then acknowledged by sending back an appropriate response to the node having transmitted the Hello message (step 675).

Figure 7:
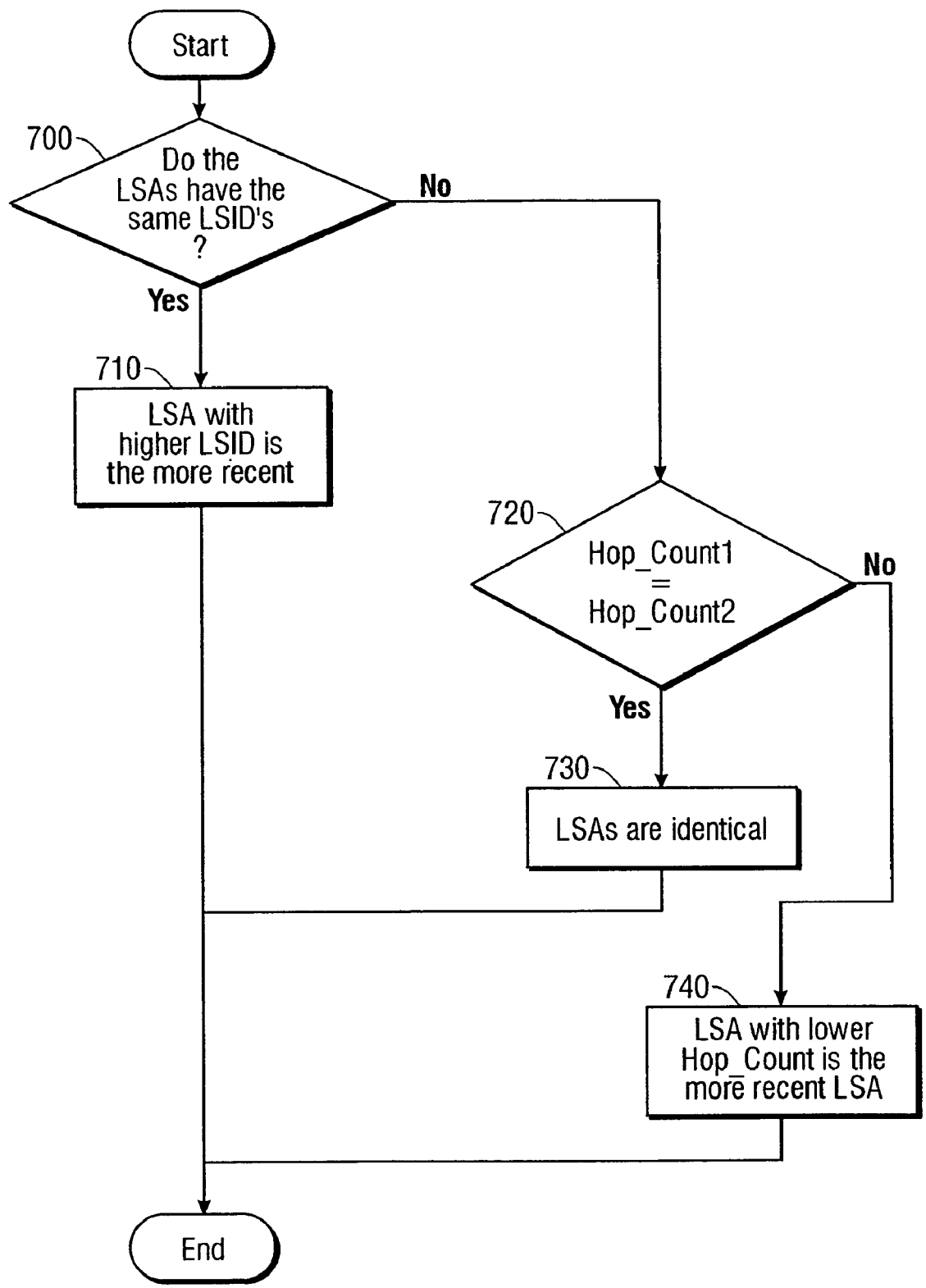
FIG. 7 is a flow diagram illustrating the actions performed in determining which of two LSAs is the more recent.

FIG. 7 illustrates one method of determining which of two LSAs is the more recent. An LSA is identified by the node ID of its originating node. For two instances of the same LSA, the process of determining the more recent of the two begins at step 700 by comparing the LSAs LSIDs. In one embodiment, the special ID FIRST_LSID is considered to be higher than any other ID. If the LSAs LSIDs are different, the LSA with the higher LSID is the more recent of the two (step 710). If the LSAs have the same LSIDs, then HOP_COUNTs are compared (step 720). If the HOP_COUNTs of the two LSAs are equal then the LSAs are identical and neither is more recent than the other (step 730). If the HOP_COUNTs are not equal, the LSA with the lower HOP_COUNT is used (step 740). Normally, however, the LSAs will have different LSIDs.

The basic flooding mechanism in which each packet is sent to all active neighbors except the one from which the packet was received can result in an exponential number of copies of each packet. This is referred to herein as a broadcast storm. The severity of broadcast storms can be limited by one or more of the following optimizations:

1. In order to prevent a single LSA from generating an infinite number of offspring, each LSA can be configured with a HOP_COUNT field. The HOP_COUNT field, which is initialized to zero by the originating node, is incremented at each hop and, when the HOP_COUNT field reaches MAX_HOP, propagation of the LSA ceases.
2. Nodes can be configured to record the node ID of the neighbor from which they received a particular LSA and then never send the LSA to that neighbor.
3. Nodes can be prohibited from generating more than one new instance of an LSA every MinLSAInterval interval (a minimum period defined in the LSA that can be used to limit broadcast storms by limiting how often an LSA may be generated or accepted (See FIG. 15 and the accompanying discussion)).
4. Nodes can be prohibited from accepting more than one new instance of an LSA less than MinLSAInterval "younger" than the copy they currently have in the database.
5. Large networks can be divided into broadcast zones as previously described, where a given instance of a flooded packed isn't allowed to leave the boundary of its originating node's zone. This optimization also has the side benefit of reducing the round trip time of packets that require an acknowledgment from the target node.

Every node establishes adjacency with all of its neighbors. The adjacencies are used to exchange Hello packets with, and to determine the status of the neighbors. Each adjacency is represented by a neighbor data structure that contains information pertinent to the relationship with that neighbor. The following fields support such a relationship:

TABLE 2

| | Fields in the neighbor data structure. |
|---|---|
| State | The state of the adjacency. |
| NodeID | Node ID of the neighbor. |
| Inactivity Timer | A one-shot timer, the expiration of which indicates that no Hello packet has been seen from this neighbor since the last HelloDeadInterval seconds. |
| HelloInterval | This is how often the neighbor wants us to send Hello packets. |
| HelloDeadInterval | This is how long the neighbor wants us to wait before declaring it dead as a result of not sending Hello packets. |
| LinkControlBlocks | A list of all links that exist between the two neighbors. |

Preferably, a node maintains a list of neighbors and their respective states locally. A node can detect the states of is neighbors using a set of "neighbor states," such as the following:

1. Down. This is the initial state of the adjacency and indicates that no valid protocol packets have been received from the neighbor.
2. INIT-Sent. This state indicates that the local node has sent an INIT request to the neighbor, and that an INIT response is expected.
3. INIT-Received. This state indicates that an INIT request was received, and acknowledged by the local node. The node is still awaiting an acknowledgment for its own INIT request from the neighbor.
4. EXCHANGE. In this state the nodes are exchanging database.

5. ACTIVE. This state is entered from the Exchange State once the two databases have been synchronized. At this stage of the adjacency, both neighbors are in full sync and ready to process other protocol packets.
6. ONE-WAY. This state is entered once an initialization message has been sent and an acknowledgment of that packet received, but before an initialization message is received from the neighboring node.

Figure 8:
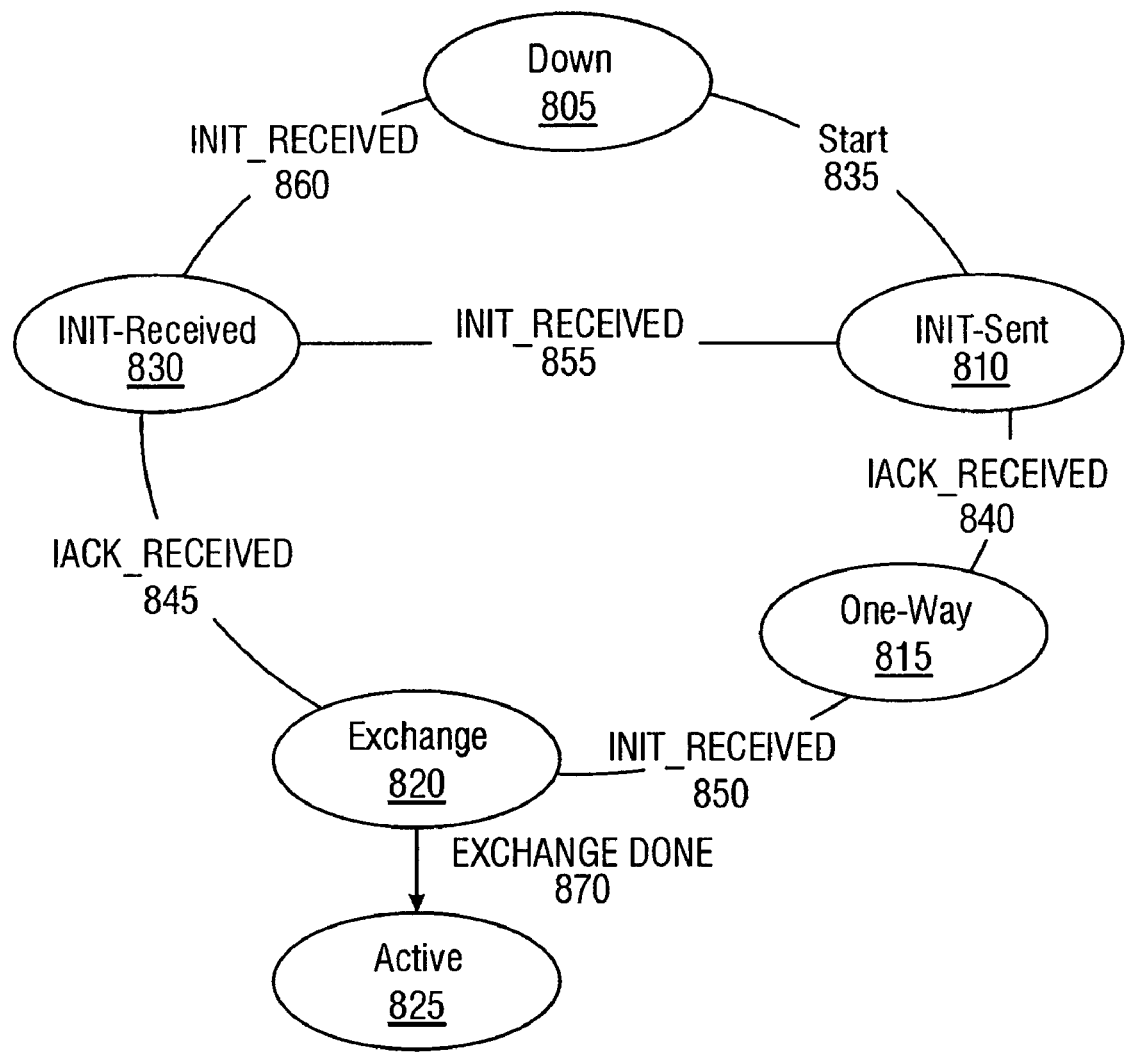
FIG. 8 is a state diagram of a Hello Machine according to the present invention.

FIG. 8 illustrates a Hello state machine (HSM) 800 according to the present invention. HSM 800 keeps track of adjacencies and their states using a set of states such as those above and transitions therebetween. Preferably, each node maintains a separate instance of HSM 800 for each of its neighbors. HSM 800 is driven by a number of events that can be grouped into two main categories: internal and external. Internal events include those generated by timers and other state machines. External events are the direct result of received packets and user actions. Each event may produce different effects, depending on the current state of the adjacency and the event itself. For example, an event may:

1. Cause a transition into a new state.
2. Invoke zero or more actions.
3. Have no effect on the adjacency or its state.

HSM 800 includes a Down state 805, an INIT-Sent state 810, a ONE-WAY state 815, an EXCHANGE state 820, an ACTIVE state 825, and an INIT-Received state 830. HSM 800 transitions between these states in response to a START transition 835, IACK_RECEIVED transitions 840 and 845, INIT_RECEIVED transitions 850, 855, and 860, and an EXCHANGE DONE transition 870 in the manner described in Table 3. It should be noted that the Disabled state mentioned in Table 3 is merely a fictional state representing a non-existent neighbor and, so, is not shown in FIG. 8 for the sake of clarity. Table 3 shows state changes, their causing events, and resulting actions.

TABLE 3

HSM transitions.

| Current State | Event | New State | Action |
|---|---|---|---|
| Disabled | all | Disabled (no change) | None |
| Down | START - Initiate the adjacency establishment process. | Init-Sent | Format and send an INIT request, and start the retransmission timer. |
| Down | INIT_RECEIVED - The local node has received an INIT request from its neighbor. | Init-Received | Format and send an INIT reply and an INIT request; start the retransmission timer. |
| Init-Sent | INIT_RECEIVED - the local node has received an INIT request from the neighbor. | Init-Received | Format and send an INIT reply. |
| Init-Sent | IACK_RECEIVED - The local node has received a valid positive response to the INIT request. | One-Way | None |
| Init-Received | IACK_RECEIVED - The local node has received a valid positive response to the INIT request. | Exchange | Format and send a Hello request. |
| One-Way | INIT_RECEIVED - The local node has received an INIT request from the neighbor. | Exchange | Format and send an INIT reply. |
| Exchange | EXCHANGE_DONE - The local node has successfully completed the database synchronization phase of the adjacency establishment process. | Active | Start the keep-alive and inactivity timers. |
| All states, except Down | HELLO_RECEIVED - The local node has received a valid Hello packet from its neighbor. | No change | Restart Inactivity timer. |
| Init-Sent, Init-Received, Exchange | TIMER_EXPIRED - The retransmission timer has expired. | Depends on the action taken | Change state to Down if MaxRetries has been reached. Otherwise, increment the retry counter and re-send the request (INIT if current state is Init-Sent or Init-Received. Hello otherwise). |
| Active | TIMER_EXPIRED - The keep-alive timer has expired. | Depends on the action taken. | Increment inactivity counter by HelloInterval, and if the new value exceeds HelloDeadInterval, then generate a LINK_DOWN event. |

TABLE 3-continued

HSM transitions.

| Current State | Event | New State | Action |
| --- | --- | --- | --- |
| | | | This indicates that the local node has not received a valid Hello packet from the neighbor in at least HelloDeadInterval seconds. Otherwise, the neighbor is still functional, so simply restart the keep-alive timer. |
| All states, except Down | LINK_DOWN - All links between the two nodes have failed and the neighbor is now unreachable. | Down | Timeout all database entries previously received from this neighbor. |
| All states, except Down | PROTOCOL_ERROR - An unrecoverable protocol error has been detected on this adjacency. | Down | Timeout all database entries previously received from this neighbor. |

After the successful exchange of INIT packets, the two neighbors enter the Exchange State. Exchange is a transitional state that allows both nodes to synchronize their databases before entering the Active State. Database synchronization involves exchange of one or more Hello packets that transfer the contents of one node's database to the other. A node should not send a Hello request while its awaiting the acknowledgment of another. The exchange may be made more reliable by causing each request to be transmitted repeatedly until a valid acknowledgment is received from the adjacent node.

When a Hello packet arrives at a node, the Hello packet is processed as previously described. Specifically, the node compares each LSA contained in the packet to the copy currently maintained in its own database. If the received copy is more recent then the node's own or advertises a better hop-count, the received copy is written into the database, possibly replacing the current copy. The exchange process is normally considered completed when each node has received, and acknowledged, a null Hello request from its neighbor. The nodes then enter the Active State with fully synchronized databases which contain the most recent copies of all LSAs known to both neighbors.

A sample exchange using the Hello protocol is described in Table 4. In the following exchange, node 1 has four LSAs in its database, while node 2 has none.

TABLE 4

Sample exchange.

| Node 1 | Node 2 |
| --- | --- |
| Send Hello Request Sequence: 1 Contents: LSA1, LSA2, LSA2, LSA4 | Send Hello Request Sequence: 1 Contents: null |
| Send Hello Response Sequence: 1 Contents: null | Send Hello Response Sequence: 1 Contents: 0x000f (acknowledges all four LSAs) |
| Send Hello Request Sequence: 2 Contents: null (no more entries) | Send Hello Response Sequence: 2 Contents: null |

Another example is the exchange described in table 5. In the following exchange, node 1 has four LSAs (1 through 4) in its database, and node 2 has 7 (3 and through 10). Additionally, node 2 has a more recent copy of LSA3 in its database than node 1.

TABLE 5

Sample exchange.

| Node 1 | Node 2 |
| --- | --- |
| Send Hello Request Sequence: 1 Contents: LSA1, LSA2, LSA2, LSA4 | Send Hello Request Sequence: 1 Contents: LSA3, LSA5, LSA6, LSA7 |
| Send Hello Response Sequence: 1 Contents: null | Send Hello Response Sequence: 1 Contents: 0x000f (acknowledges all four LSAs) |
| Send Hello Request Sequence: 2 Contents: null (no more entries) | Send Hello Response Sequence: 2 Contents: LSA8, LSA9, LSA10 |
| Send Hello Response Sequence: 2 Contents: 0x0007 (acknowledges all three LSAs) | Send Hello Response Sequence: 2 Contents: null |
| Send Hello Response Sequence: 3 Contents: null | Send Hello Request Sequence: 3 Contents: null (no more entries) |

At the end of the exchange, both nodes will have the most recent copy of all 10 LSAs (1 through 10) in their databases.

Provisioning

For each VP to be configured (or, as also referred to herein, provisioned), a physical path must be selected and configured. VPs may be provisioned statically or dynamically. For example, a user can identify the nodes through which the VP will pass and manually configure each node to support the given VP. The selection of nodes may be based on any number of criteria, such as QoS, latency, cost, and the like. Alternatively, the VP may be provisioned dynamically using any one of a number of methods, such as a shortest path first technique or a distributed technique. A shortest path first technique might, for example, employ the shortest path first technique such as that described in patent application Ser. No. 09/478, 235, entitled "A METHOD FOR PATH SELECTION IN A NETWORK," having A. N. Saleh as inventor, which is incorporated by reference herein in its entirety and for all purposes.

An example of a distributed technique is the restoration method described subsequently herein.

Failure Detection, Propagation, and Restoration

Failure Detection and Propagation

In one embodiment of networks herein, failures are detected using the mechanisms provided by the underlying physical network. For example, when using a SONET network, a fiber cut on a given link results in a loss of signal (LOS) condition at the nodes connected by that link. The LOS condition propagates an Alarm Indication Signal (AIS) and Remote Defect Indication (RDI), and generates an LOS defect locally. The defect is upgraded to a failure 2.5 seconds later, which causes an alarm to be sent to the Operations System (OS) (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). Preferably when using SONET, the handling of the LOS condition follows Bellcore's recommendations in GR-253, which allows nodes to inter-operate, and co-exist, with other network equipment (NE) in the same network and which is included by reference herein in its entirety and for all purposes. The mesh restoration protocol is invoked as soon as the LOS defect is detected by the line card, which occurs 3 ms following the failure (a requirement under GR-253).

Under GR-253, downstream is in the direction of the failure, and upstream is opposite in direction to the failure. A defect in the direction from the source to the destination would therefore cause an AIS to be propagated upstream and an RDI to be propagated downstream. The arrival of the AIS at the node upstream from the failure causes the upstream node to send a similar alarm to its upstream neighbor and for that node to send an AIS to its own upstream neighbor. This continues from node to node until the AIS finally reaches the source node of the affected VP, or a proxy node if the source node is located in a different zone. In the latter case, the boundary node restores the VP on behalf of the source node. Under GR-253, each node is allowed a maximum of 125 microseconds to forward the AIS upstream, which quickly propagates failures toward the source (or proxy) node.

Once a node has detected a failure on one of its links, either through a local LOS defect or a received AIS indication, the node scans its VP table looking for entries that have the failed link in their path. When the node finds one, the node releases all link bandwidth used by the VP. Then, if the node is a VP's source node or a proxy node, the VP's state is changed to RESTORING and the VP placed on a list of VPs to be restored. Otherwise (if the node isn't the source node or a proxy node), the state of the VP is changed to DOWN, and a timer is started to delete the VP from the database if a corresponding restore-path request isn't received from the origin node within a certain timeout period. The VP list that was created in the previous step is ordered by quality of service (QoS), which ensures that VPs with a higher QoS setting are restored first. Each entry in the list includes the ID of the VP, its source and destination nodes, configured QoS level, and required bandwidth.

Figure 9:
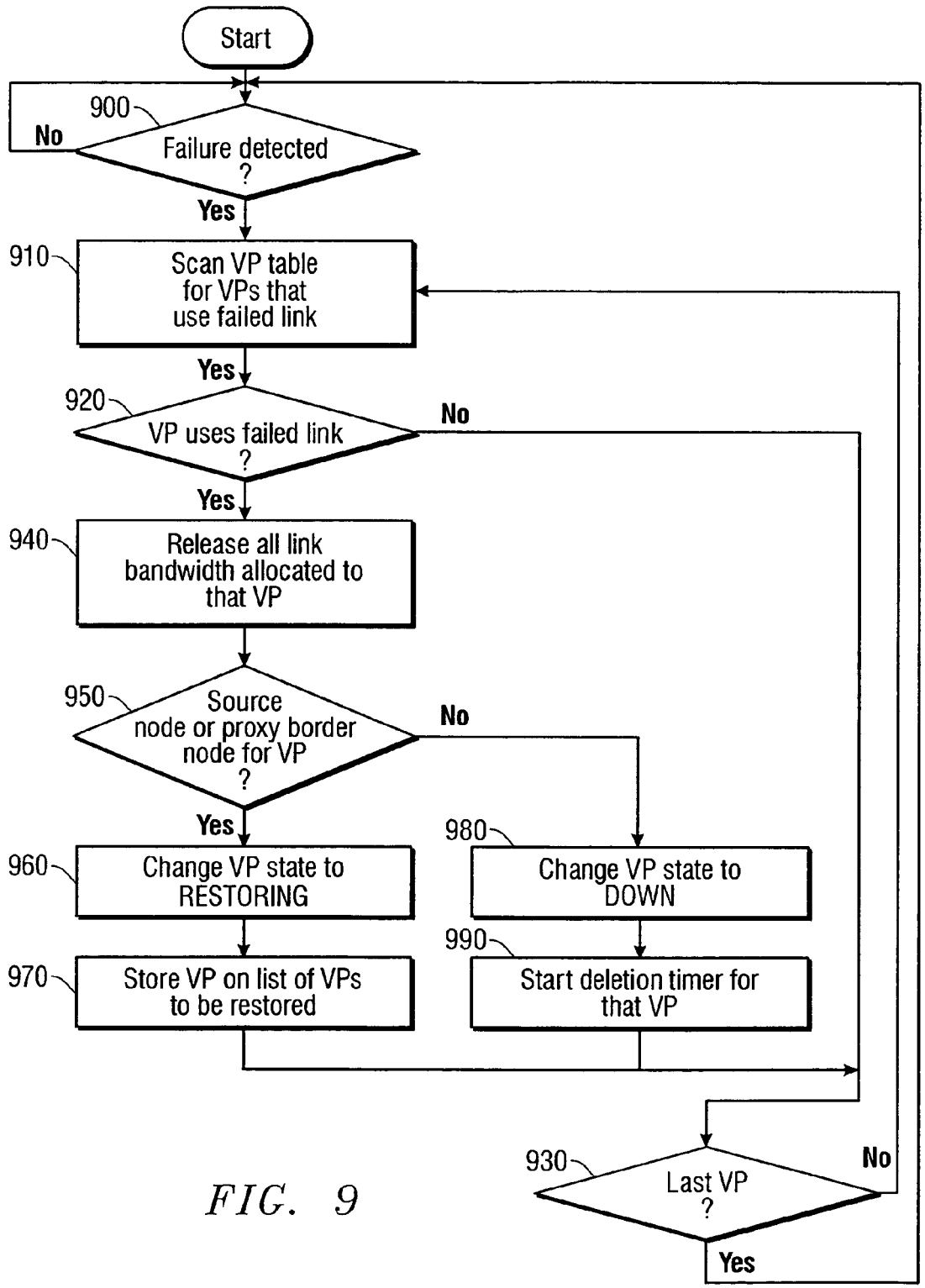
FIG. 9 is a flow diagram illustrating the actions performed in preparation for path restoration in response to a link failure.

FIG. 9 illustrates the steps performed in response to the failure of a link. As noted, the failure of a link results in a LOS condition at the nodes connected to the link and generates the appropriate AIS and RDI indications. If an AIS or RDI were received from a node, a failure has been detected (step 900). In that case, each affected node performs several actions in order to maintain accurate status information with regard to the VPs currently supported. The first action taken in such a case is that the node scans its VP table looking for entries that have the failed link in their path (steps 910 and 920). If the VP does not use the failed link, the node goes to the next VP in the table and begins analyzing that entry (step 930). If the selected VP uses the failed link, the node releases all link bandwidth allocated to that VP (step 940). The node then determines whether it is a source node or a proxy node for the VP (step 950). If this is the case, the node changes the VP's state to RESTORING (step 960) and stores the VP on the list of VPs to be restored (step 970). If the node is not a source node or proxy node for the VP, the node changes the VP state to DOWN (step 980) and starts a deletion timer for that VP (step 990).

Failure Restoration

For each VP on the list, the node then sends an RPR to all eligible neighbors (i.e., a node adjacent to the given node) in order to restore the given VP. The network will, of course, attempt to restore all failed VPs. Neighbor eligibility is determined by the state of the neighbor, available link bandwidth, current zone topology, location of the Target node, and other parameters. One method for determining the eligibility of a particular neighbor follows:
1. The origin node builds a shortest path first (SPF) tree with "self" as root. Prior to building the SPF tree, the link-state database is pruned of all links that either don't have enough (available) bandwidth to satisfy the request, or have been assigned a QoS level that exceeds that of the VP being restored.
2. The node then selects the output link(s) that can lead to the target node in less than MAX_HOPS i. The structure and contents of the SPF tree generated simplifies this step.

The RPR carries information about the VP, such as:
1. The node IDs of the origin and target nodes.
2. The ID of the VP being restored.
3. A locally unique sequence number that gets incremented by the origin node on every retransmission of the request. The sequence number, along with the node and VP IDs, allow specific instances of an RPR to be identified by the nodes.
4. A field that carries the distance, in hops, between the origin node and the receiving node. This field is initially set to zero by the originating node, and is incremented by 1 by each node along the path.
5. An array of link IDs that records the path of the message on its trip from the origin node to the target node.

Due to the way RPR messages are forwarded by tandem nodes and the unconditional and periodic retransmmission of such messages by origin nodes, multiple instances of the same request are not uncommon, even multiple copies of each instance, circulating the network at any given time. To minimize the amount of broadcast traffic generated by the protocol and aid tandem nodes in allocating bandwidth fairly for competing RPRs, tandem nodes preferably execute a sequence such as that described subsequently.

The term "same instance," as used below, refers to messages that carry the same VP ID, origin node ID, and hop-count, and are received from the same tandem node (usually, the same input link, assuming only one link between nodes). Any two messages that meet the above criteria are guaranteed to have been sent by the same origin node, over the same link, to restore the same VP, and to have traversed the same path. The terms "copy of an instance," or more simply "copy" are used herein to refer to a retransmission of a given instance. Normally, tandem nodes select the first instance they receive since in most, but not all cases, as the first RPR received normally represents the quickest path to the origin node. A method for making such a determination was described in reference to FIG. 5. Because such information must be stored for numerous RPRs, a standard data structure is defined under a protocol of the present invention.

The Restore-Path Request Entry (RPRE) is a data structure that maintains information about a specific instance of a RPRE packet. Tandem nodes use the structure to store information about the request, which helps them identify and reject other instances of the request, and allows them to correlate received responses with forwarded requests. Table 6 lists an example of the fields that are preferably present in an PRE.

TABLE 6

RPR Fields

| Field | Usage |
|---|---|
| Origin Node | The node ID of the node that originated this request. This is either the source node of the VP or a proxy node. |
| Target Node | Node ID of the target node of the restore path request. This is either the destination node of the VP or a proxy node. |
| Received From | The neighbor from which we received this message. |
| First Sequence Number | Sequence number of the first received copy of the corresponding restore-path request. |
| Last Sequence Number | Sequence number of the last received copy of the corresponding restore-path request. |
| Bandwidth | Requested bandwidth. |
| QoS | Requested QoS. |
| Timer | Used by the node to timeout the RPR. |
| T-Bit | Set to 1 when a Terminate indicator is received from any of the neighbors. |
| Pending Replies | Number of the neighbors that haven't acknowledged this message yet. |
| Sent To | A list of all neighbors that received a copy of this message. Each entry contains the following information about the neighbor: AckReceived: Indicates if a response has been received from this neighbor. F-Bit: Set to 1 when Flush indicator from this neighbor. |

When an RPR packet arrives at a tandem node, a decision is made as to which neighbor should receive a copy of the request. The choice of neighbors is related to variables such as link capacity and distance. Specifically, a particular neighbor is selected to receive a copy of the packet if:

1. The output link has enough resources to satisfy the requested bandwidth. Nodes maintain a separate "available bandwidth" counter for each of the defined QoS levels (e.g. QoS0-2 and QoS3). VPs assigned to certain QoS level, say "n," are allowed to use all link resources reserved for that QoS level and all levels below, i.e., all resources reserved for levels 0 through n, inclusive.
2. The path through the neighbor is less than MAX_HOPS in length. In other words, the distance from this node to the target node is less than MAX_HOPS minus the distance from this node to the origin node.
3. The node hasn't returned a Flush response for this specific instance of the RPR, or a Terminate response for this or any other instance.

The Processing of Received RPRs

Figure 10A:
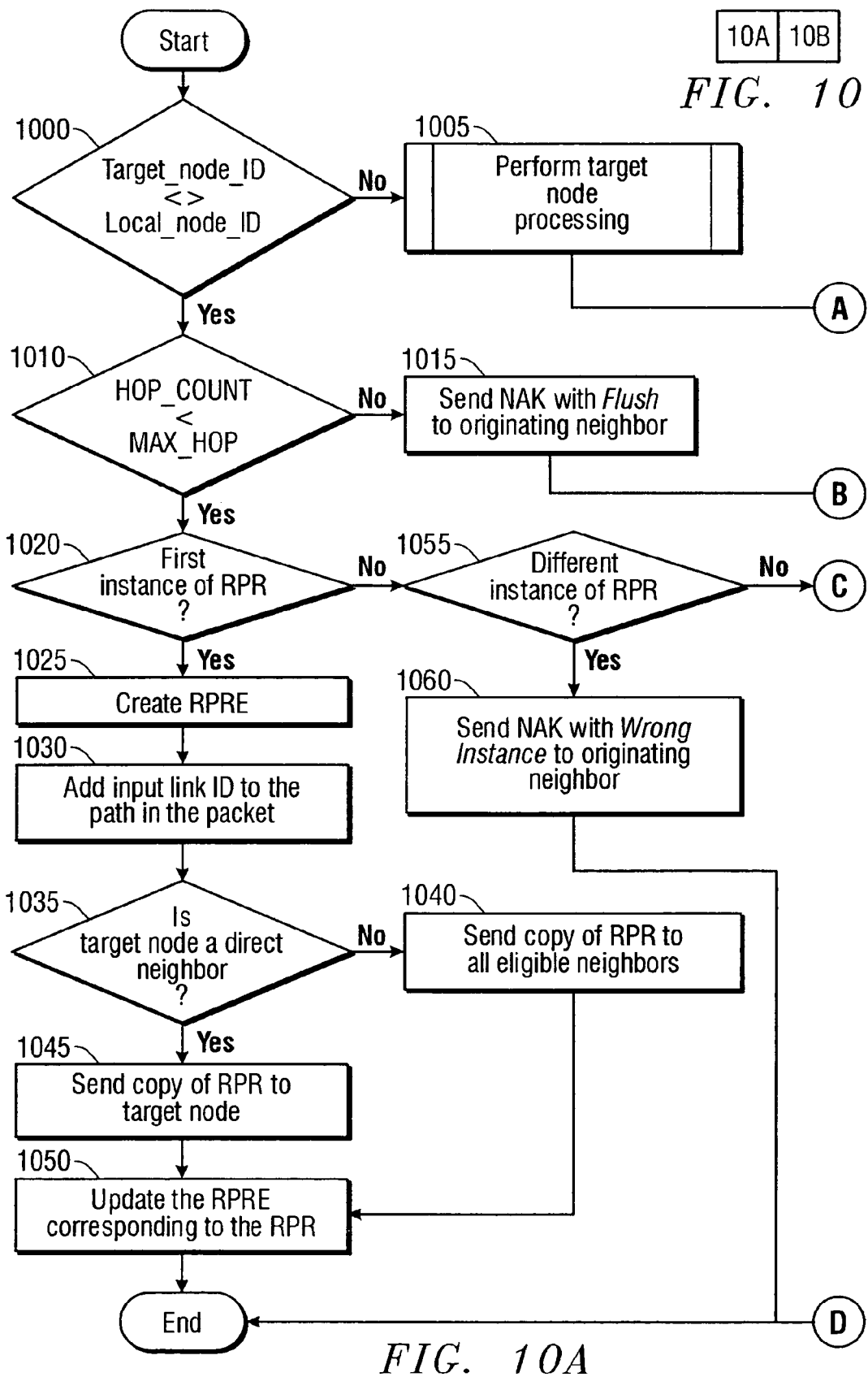
FIG. 10 is a flow diagram illustrating the actions performed in processing received Restore-Path Requests (RPR) executed by tandem nodes.
Figure 10B:
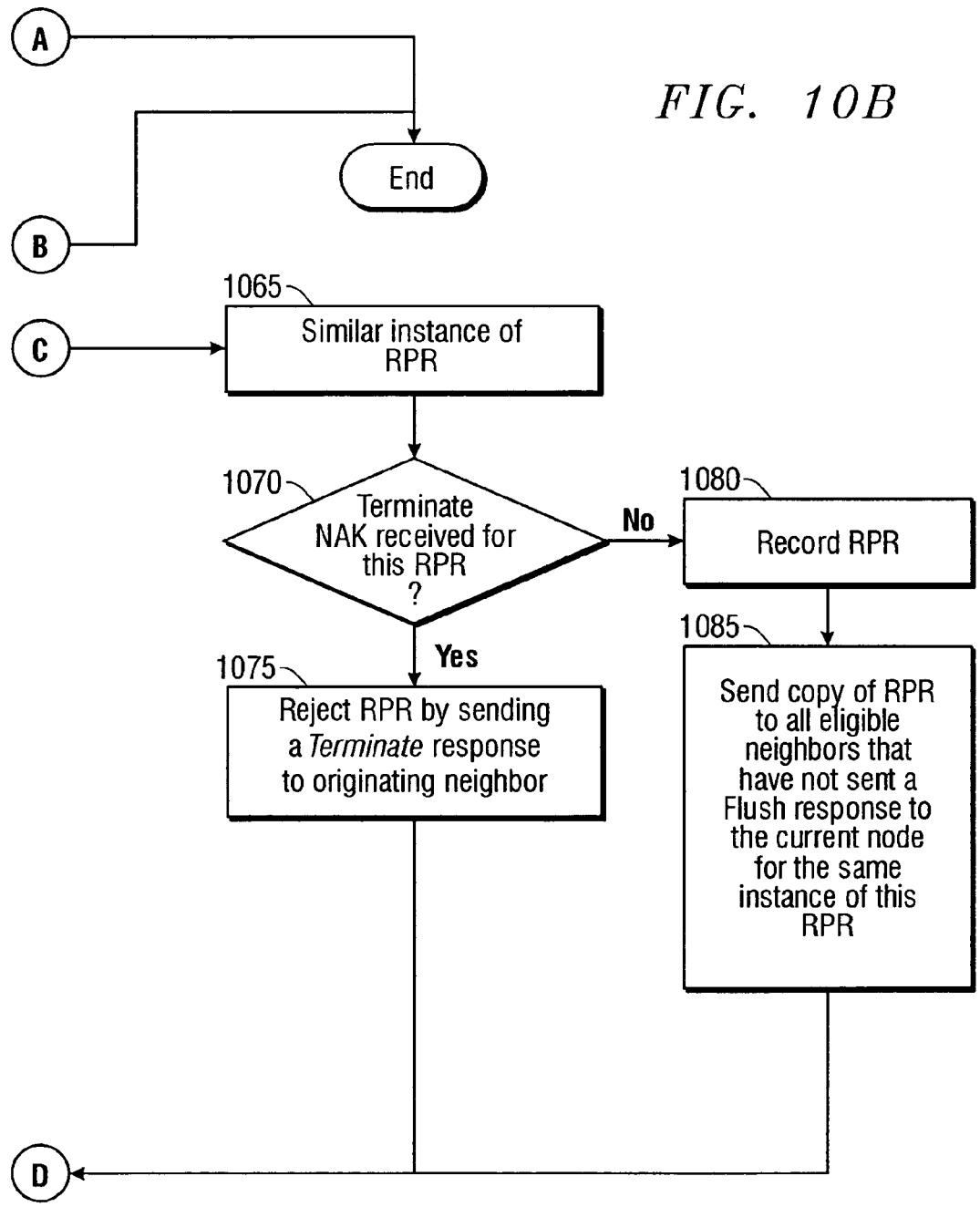

FIG. 10 illustrates the actions performed by tandem nodes in processing received RPR tests. Assuming that this is the first instance of the request, the node allocates the requested bandwidth on eligible links and transmits a modified copy of the received message onto them. The bandwidth remains allocated until a response (either positive or negative) is received from the neighboring node, or a positive response is received from any of the other neighbors (see Table 7 below). While awaiting a response from its neighbors, the node cannot use the allocated bandwidth to restore other VPs, regardless of their priority (i.e. QoS).

Processing of RPRs begins at step 1000, in which the target node's ID is compared to the local node's ID. If the local node's ID is equal to the target node's ID, the local node is the target of the RPR and must process the RPR as such. This is illustrated in FIG. 10 as step 1005 and is the subject of the flow diagram illustrated in FIG. 11. If the local node is not the target node, the RPR's HOP_COUNT is compared to MAX_HOP in order to determine if the HOP_COUNT has exceed or will exceed the maximum number of hops allowable (step 1010). If this is the case, a negative acknowledgment (NAK) with a Flush indicator is then sent back to the originating node (step 1015). If the HOP_COUNT is still within acceptable limits, the node then determines whether this is the first instance of the RPR having been received (step 1020). If this is the case, a Restore-Path Request Entry (RPRE) is created for the request (step 1025). This is done by creating the RPRE and setting the RPRE's fields, including starting a time-to-live (TTL) or deletion timer, in the following manner:

RPRE.SourceNode=Header.Origin
RPRE.Destination Node=Header.Target
RPRE.FirstSequence Number=Header.SequenceNumber
RPRE.Last Sequence Number=Header.Sequence Number
RPRE.QoS=Header.Parms.RestorePath.QoS
RPRE.Bandwidth=Header. Parms.RestorePath.Bandwidth
RPRE.ReceivedFrom=Node ID of the neighbor that sent us this message
StartTimer (RPRE.Timer, RPR_TTL)

The ID of the input link is then added to the path in the RPRE (e.g., Path[PathIndex++]=LinkID) (step 1030). Next, the local node determines whether the target node is a direct neighbor (step 1035). If the target node is not a direct neighbor of the local node, a copy of the (modified) RPR is sent to all eligible neighbors (step 1040). The PendingReplies and SentTo Fields of the corresponding RPRE are also updated accordingly at this time. If the target node is a direct neighbor of the local node, the RPR is sent only to the target node (step 1045). In either case, the RPRE corresponding to the given RPR is then updated (step 1050).

If this is not the first instance of the RPR received by the local node, the local node then attempts to determine whether this might be a different instance of the RPR (step 1055). A request is considered to be a different instance if the RPR:

1. Carries the same origin node IDs in its header;
2. Specifies the same VP ID; and
3. Was either received from a different neighbor or has a different HOP_COUNT in its header.

If this is simply a different instance of the RPR, and another instance of the same RPR has been processed, and accepted, by this node, a NAK Wrong Instance is sent to the originating neighbor (step 1060). The response follows the reverse of the path carried in the request. No broadcasting is therefore necessary in such a case. If a similar instance of the RPR has been processed and accepted by this node (step 1065), the local node determines whether a Terminate NAK has been received for this RPR (step 1070). If a Terminate NAK has been received for this RPR, the RPR is rejected by sending a Terminate response to the originating neighbor (step 1075). If a Terminate NAK was not received for this RPR, the new sequence number is recorded (step 1080) and a copy of the RPR is forwarded to all eligible neighbors that have not sent a Flush response to the local node for the same instance of this RPR (step 1085). This may include nodes that weren't previously considered by this node due to conflicts with other VPs, but does not include nodes from which a Flush response has already been received for the same instance of this RPR. The local node should then save the number of sent requests in the PendingReplies field of the corresponding RPRE. The term "eligible neighbors" refers to all adjacent nodes that are connected through links that meet the link-eligibility requirements previously described. Preferably, bandwidth is allocated only once for each request so that subsequent transmissions of the request do not consume any bandwidth.

Note that the bandwidth allocated for a given RPR is released differently depending on the type of response received by the node and the setting of the Flush and Terminate indicators in its header. Table 7 shows the action taken by a tandem node upon receiving a restore path response from a neighbor.

TABLE 7

Actions taken by a tandem node upon receiving an RPR.

| Response Type | Flush Indicator? | Terminate Indicator? | Received Sequence Number | Action |
|---|---|---|---|---|
| X | X | X | Not Valid | Ignore response |
| Negative | No | No | 1 = Last | Ignore response |
| Negative | X | No | =Last | Release bandwidth allocated for the VP on the link on which the response was received. |
| Negative | Yes | No | Valid | Release bandwidth allocated for the VP on the link on which the response was received. |
| Negative | X | Yes | Valid | Release all bandwidth allocated for the VP. |
| Positive | X | X | Valid | Commit bandwidth allocated for the VP on the link the response was received on; release all other bandwidth. |

Figure 11:
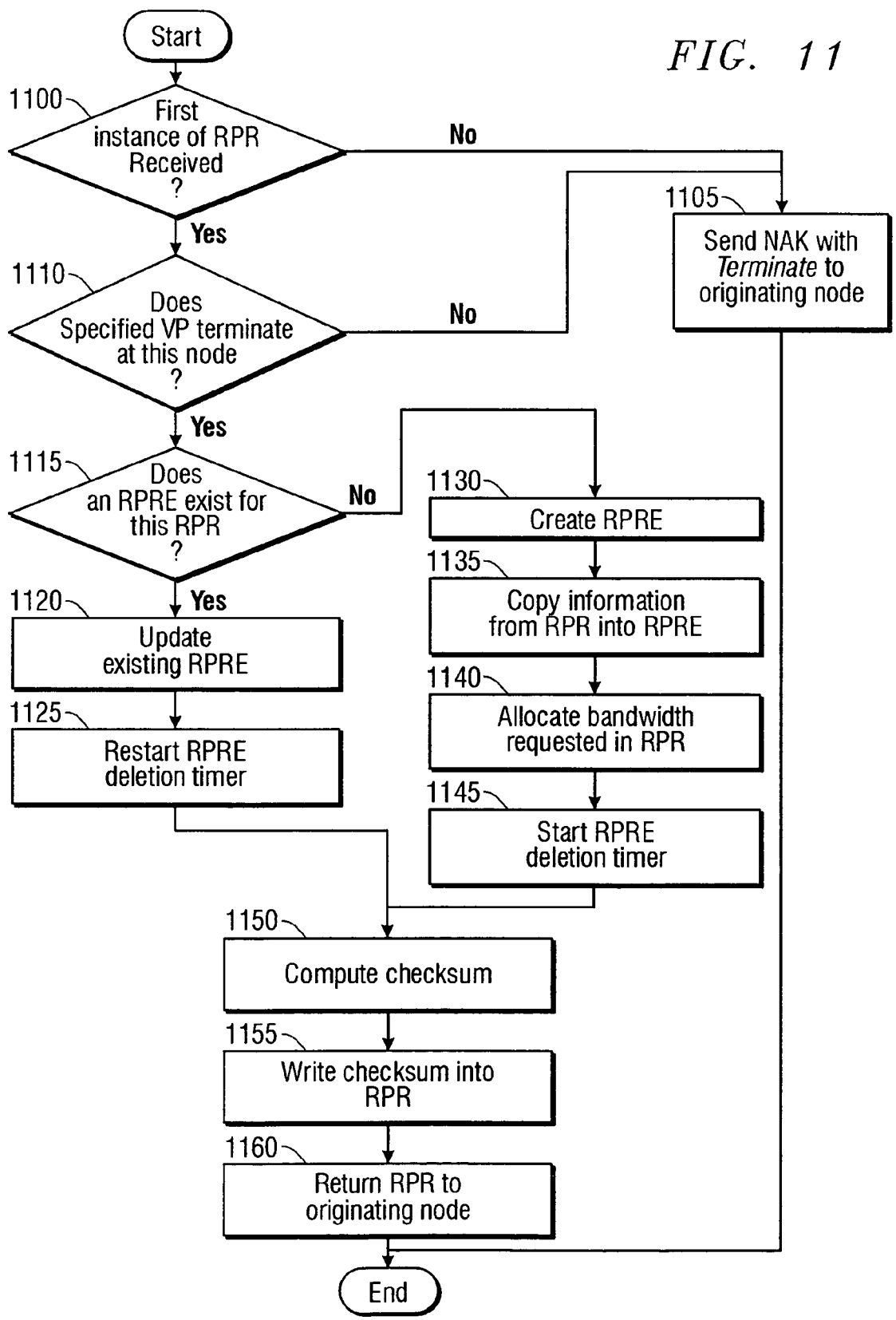
FIG. 11 is a flow diagram illustrating the actions performed in the processing of an RPR by the RPR's target node.

FIG. 11 illustrates the process performed at the target node once the RPR finally reaches that node. When the RPR reaches its designated target node, the target node begins processing of the RPR by first determining whether this is the first instance of this RPR that has been received (step 1100). If that is not the case, a NAK is sent with a Terminate indicator sent to the originating node (step 1105). If this is the first instance of the RPR received, the target node determines whether or not the VP specified in the RPR actually terminates at this node (step 1110). If the VP does not terminate at this node, the target node again sends a NAK with a Terminate to the originating node (step 1105). By sending a NAK with a Terminate indicator, resources allocated along the path are freed by the corresponding tandem nodes.

If the VP specified in the RPR terminates at this node (i.e. this node is indeed the target node), the target node determines whether an RPRE exists for the RPR received (step 1115). If an RPRE already exists for this RPR, the existing RPRE is updated (e.g., the RPRE's LastSequenceNumber field is updated) (step 1120) and the RPRE deletion timer is restarted (step 1125). If no RPRE exists for this RPR in the target node (i.e., if this is the first copy of the instance received), an RPRE is created (step 1130), pertinent information from the RPR is copied into the RPRE (step 1135), the bandwidth requested in the RPR is allocated on the input link by the target node (step 1140) and an RPRE deletion timer is started (step 1145). In either case, once the RPRE is either updated or created, a checksum is computed for the RPR (step 1150) and written into the checksum field of the RPR (step 1155). The RPR is then returned as a positive response to the origin node (step 1160). The local (target) node then starts its own matrix configuration. It will be noted that the RPRE created is not strictly necessary but makes the processing of RPRs consistent across nodes.

The Processing of Received RPR Responses

Figure 12A:
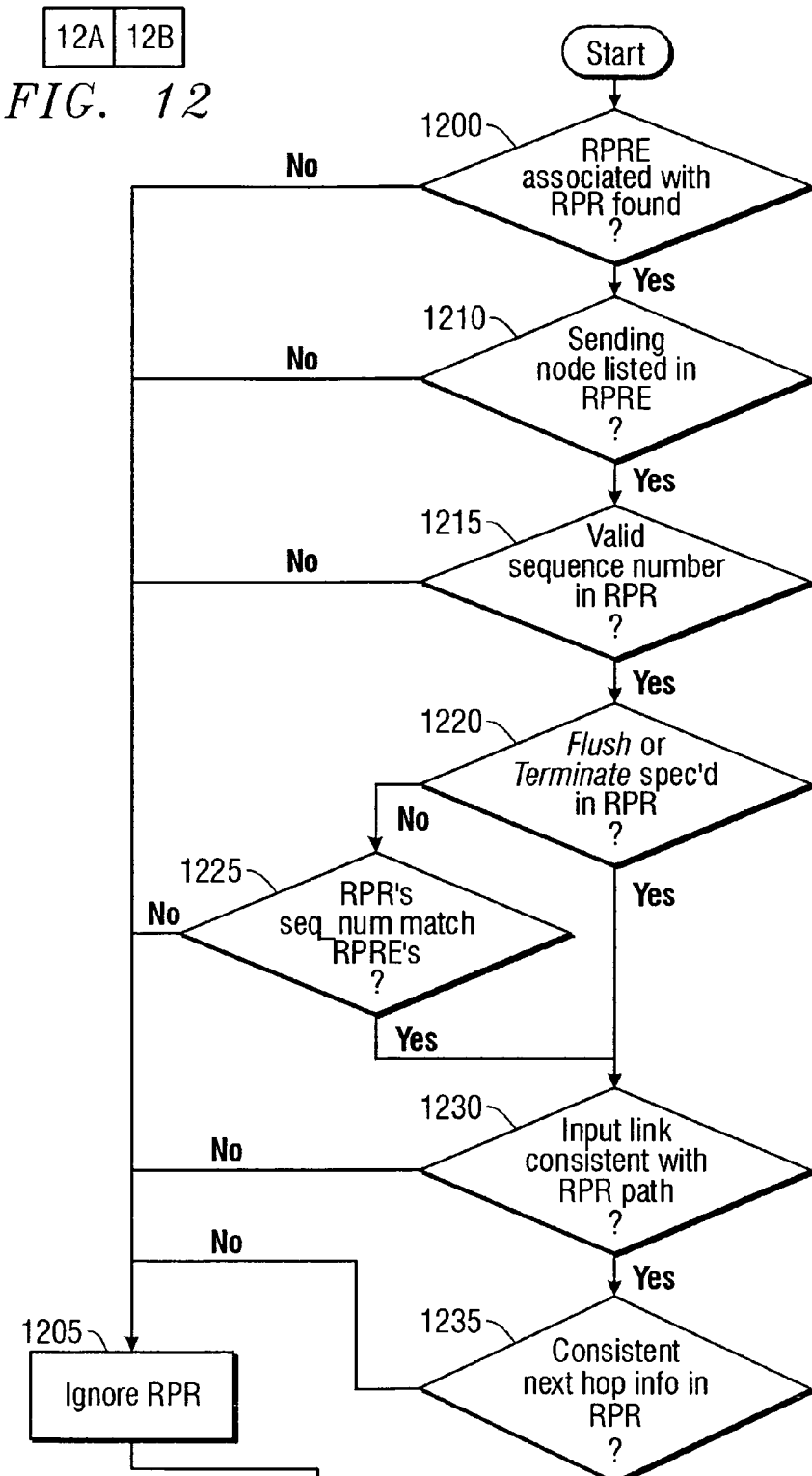
FIG. 12 is a flow diagram illustrating the actions performed in returning a negative response in response to an RPR.
Figure 12B:
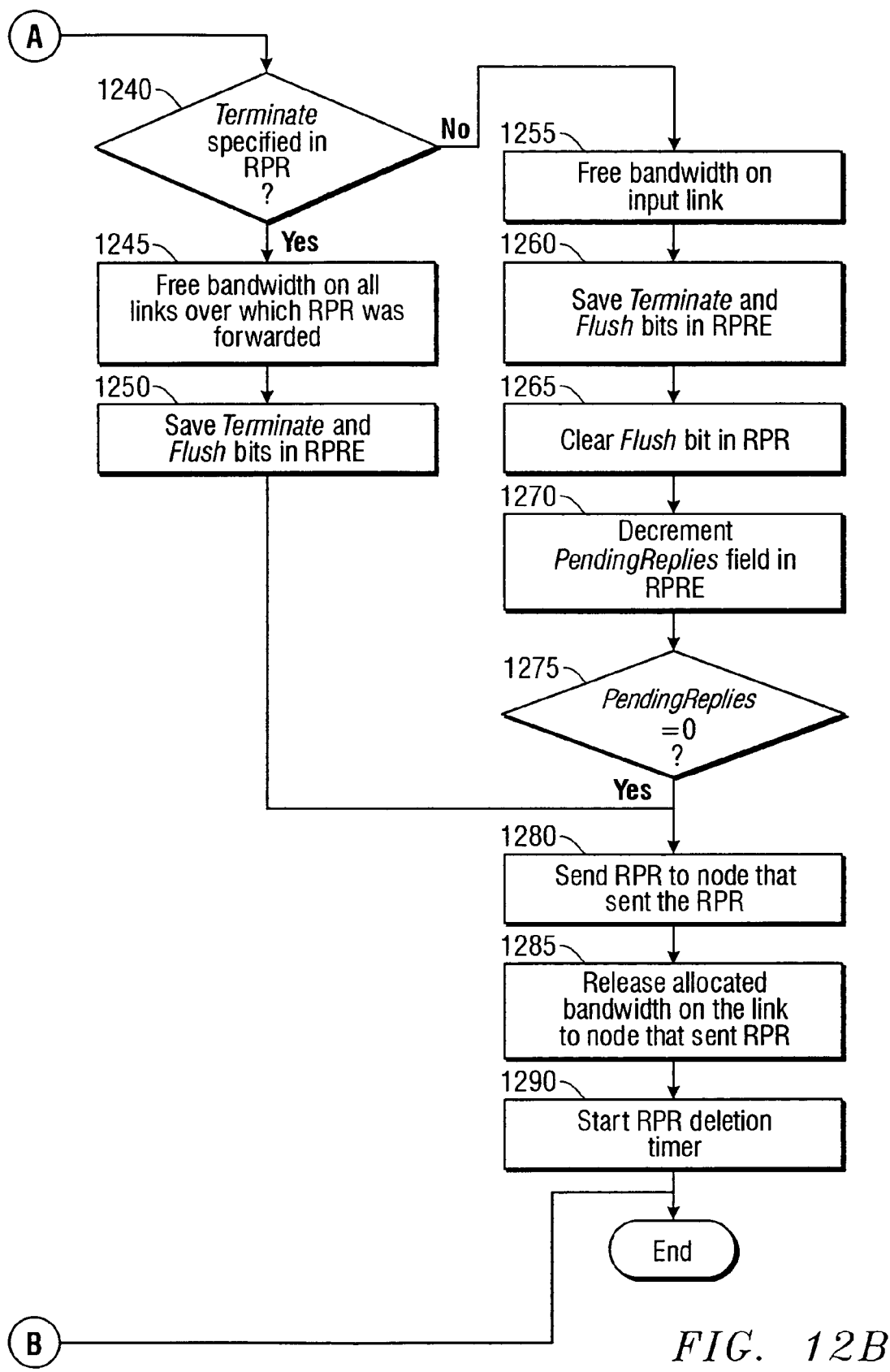
Figure 13:
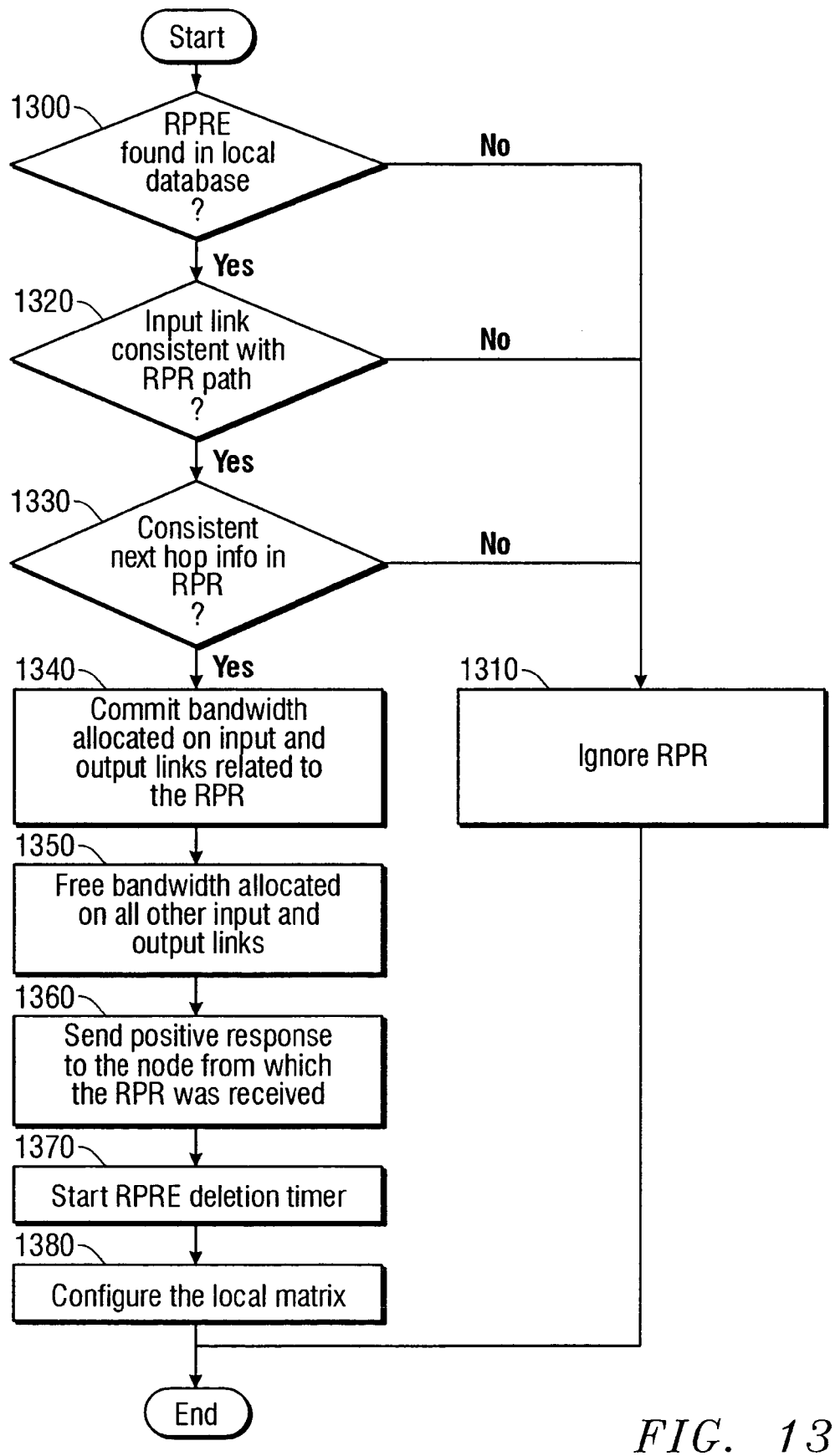
FIG. 13 is a flow diagram illustrating the actions performed in returning a positive response to a received RPR.

FIGS. 12 and 13 are flow diagrams illustrating the processes performed by originating nodes that receive negative and positive RPR responses, respectively. Negative RPR responses are processed as depicted in FIG. 12. An originating node begins processing a negative RPR response by determining whether the node has an RPRE associated with the RPR (step 1200). If the receiving node does not have an RPRE for the received RPR response, the RPR response is ignored (step 1205). If an associated RPRE is found, the receiving node determines whether the node sending the RPR response is listed in the RPRE (e.g., is actually in the SentTo list of the RPRE) (step 1210). If the sending node is not listed in the RPRE, again the RPR response is ignored (step 1205).

If the sending node is listed in the RPRE, the RPR sequence number is analyzed to determine its validity (step 1215). As with the previous steps, if the RPR contains an invalid sequence number (e.g., doesn't fall between FirstSequenceNumber and LastSequence Number, inclusive), the RPR response is ignored (step 1205). If the RPR sequence number is valid, the receiving node determines whether Flush or Terminate in the RPR response (step 1220). If neither of these is specified, the RPR response sequence number is compared to that stored in the last sequence field of the RPR (step 1225). If the RPR response sequence number does not match that found in the last sequence field of the RPRE, the RPR response is again ignored (step 1205). If the RPR response sequence number matches that found in the RPRE, or a Flush or Terminate was specified in the RPR, the input link on which the RPR response was received is compared to that listed in the RPR response path field (e.g., Response.Path [Response.PathIndex]==InputLinkID) (step 1230). If the input link is consistent with information in the RPR, the next hop information in the RPR is checked for consistency (e.g., Response.Path [Response.PathIndex+1]==RPRE.ReceivedFrom) (step 1235). If either of the proceeding two tests are failed, the RPR response is again ignored (step 1205).

If a Terminate was specified in the RPR response (step 1240), the bandwidth on all links over which the RPR was forwarded is freed (step 1245) and the Terminate and Flush bits from the RPR response are saved in the RPRE (step 1250). If a Terminate was not specified in the RPR response, bandwidth is freed only on the input link (i.e., the link from which the response was received) (step 1255), the Terminate and Flush bits are saved in the RPRE (step 1260), and the Flush bit of the RPR is cleared (step 1265). If a Terminate was not specified in the RPR, the Pending Replies field in the RPRE is decremented (step 1270). If this field remains non-zero after being decremented, the process completes. If Pending Replies is equal to zero at this point, or a Terminate was not specified in the RPR, the RPR is sent to the node specified in the RPR's Received From field (i.e. the node that sent the corresponding request) (step 1280). Next, the bandwidth allocated on the link to the node specified in the RPR's Received From field is released (step 1285), and an RPR deletion timer is started (step 1290).

FIG. 13 illustrates the steps taken in processing positive RPR responses. The processing of positive RPR responses begins at step 1300 with a search of the local database to determine whether an RPRE corresponding to the RPR response is stored therein. If a corresponding RPRE cannot be found, the RPR response is ignored (step 1310). If the RPR response RPRE is found in the local database, the input link is verified as being consistent with the path stored in the RPR (step 1320). If the input link is not consistent with the RPR path, the RPR response is ignored once again (step 1310). If the input link is consistent with path information in the RPR, the next hop information specified in the RPR response path is compared with the Received From field of the RPRE (e.g., Response. Path[Response. PathIndex+1]!=RPRE.Received-From) (step 1330). If the next hop information is not consistent, the RPR response is again ignored (step 1310). However, if the RPR response's next hop information is consistent, bandwidth allocated on input and output links related to the RPR is committed (step 1340). Conversely, bandwidth allocated on all other input and output links for that VP is freed at this time (step 1350). Additionally, a positive response is sent to the node from which the RPR was received (step 1360), and an RPR deletion timer is started (step 1370) and the local matrix is configured (step 1380).

With regard to matrix configuration, the protocol pipelines such activity with the forwarding of RPRs in order to minimize the impact of matrix configuration overhead on the time required for restoration. While the response is making its way from node N1 to node N2, node N1 is busy configuring its matrix. In most cases, by the time the response reaches the origin node, all nodes along the path have already configured their matrices.

The Terminate indicator prevents "bad" instances of an RPR from circulating around the network for extended periods of time. The indicator is propagated all the way back to the originating node and prevents the originating node, and all other nodes along the path, from sending or forwarding other copies of the corresponding RPR instance.

Terminating RPR Packets are processed as follows. The RPR continues along the path until one or more of the following four conditions are encountered:

1. Its HOP_COUNT reaches the maximum allowed (i.e. MAX_HOPS).
2. The request reaches a node that doesn't have enough bandwidth on any of its output links to satisfy the request.
3. The request reaches a node that had previously accepted a different instance of the same request from another neighbor.
4. The request reaches its ultimate destination: the target node, which is either the Destination node of the VP, or a proxy node if the Source and Destination nodes are located in difference zones.

Conditions 1, 2 and 3 cause a negative response to be sent back to the originating node, flowing along the path carried in the request, but in the reverse direction.

Further optimizations of the protocol can easily be envisioned by one of skill in the art and are intended to be within the scope of this specification. For example, in one embodiment, a mechanism is defined to further reduce the amount of broadcast traffic generated for any given VP. In order to prevent an upstream neighbor from sending the same instance of an RPR every T milliseconds, a tandem node can immediately return a no-commit positive response to that neighbor, which prevents the neighbor from sending further copies of the instance. The response simply acknowledges the receipt of the request, and doesn't commit the sender to any of the requested resources. Preferably, however, the sender (of the positive response) periodically transmits the acknowledged request until a valid response is received from its downstream neighbor(s). This mechanism implements a piece-wise, or hop-by-hop, acknowledgment strategy that limits the scope of retransmitted packets to a region that gets progressively smaller as the request gets closer to its target node.

Optimizations

However, it is prudent to provide some optimizations for the efficient handling of errors. Communication protocols often handle link errors by starting a timer after every transmission and, if a valid response isn't received within the timeout period, the message is retransmitted. If a response isn't received after a certain number of retransmission, the sender generates a local error and disables the connection. The timeout period is usually a configurable parameter, but in some cases the timeout period is computed dynamically, and continuously, by the two end points. The simplest form of this uses some multiple of the average round trip time as a timeout period, while others use complex mathematical formulas to determine this value. Depending on the distance between the two nodes, the speed of link that connects them, and the latency of the equipment along the path, the timeout period can range anywhere from millisecond to seconds.

The above strategy, is not the preferred method of handling link errors because the fast restoration times required dictates that 2-way, end-to-end communication be carried out in less than 50 ms. A drawback of the above-described solution is the time wasted while waiting for an acknowledgment to come back from the receiving node. A safe timeout period for a 2000 mile span, for instance, is over 35 ms, which doesn't leave enough time for a retransmission in case of an error.

This problem is addressed in one embodiment by taking advantage of the multiple communication channels, i.e. OC-48's that exist between nodes to:

1. Send N copies (N>=1) of the same request over as many channels, and
2. Re-send the request every T milliseconds (1 ms<10 ms) until a valid response is received from the destination node.

The protocol can further improve link efficiency by using small packets during the restoration procedure. Another improvement is the use of a zoned network architecture, as described previously, and the restoration procedure for which is described below.

Failure Restoration in a Zoned Network

Figure 14:
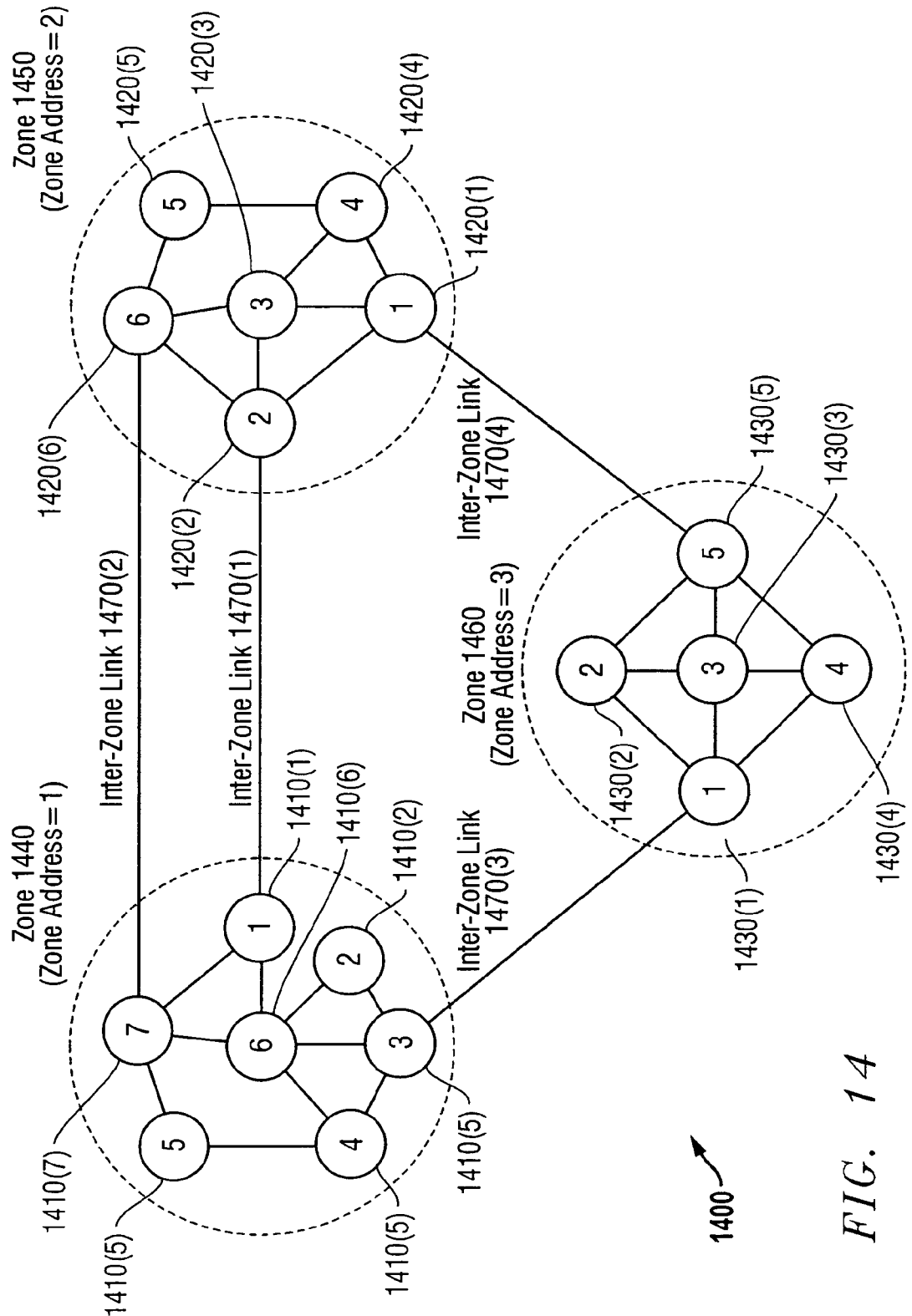
FIG. 14 is a block diagram illustrating an exemplary network according to the present invention.

FIG. 14 illustrates an exemplary multi-zone network 1400 organized into zones according to one embodiment of the present invention. Network 1400 includes nodes 1410(1)-(7), nodes 1420(1)-(6), and nodes 1430(1)-(5). Those nodes are grouped into zones 1440, 1450, and 1460, and a backbone zone 1465, as is illustrated in FIG. 14. The zones are linked to one another by inter-zone links 1470(1)-(4).

Addressing in such a network could use an addressing scheme, and could, for example, use an addressing scheme such as that shown in FIG. 1 as a type 1 address. This would likely be appropriate given the fact that there are a relatively small number of zones, with each including a relatively small number of nodes. Using such an addressing scheme, zones 1440, 1450, and 1460 are assigned zone IDs 1, 2, and 3, respectively, with zone ID 0 being reserved for the inter-zone, or backbone, zone. Within these zones, each one of nodes 1410(1)-(7), 1420(1)-(6), and 1430(1)-(5) is assigned a node ID made up of the zone ID for the node's zone and a node address within the zone (1-7, 1-6, and 1-5, respectively). Node addresses for each of nodes 1410(1)-(7), 1420(1)-(6), and 1430(1)-(5) are provided as numerals within each of the circles representing the nodes in FIG. 14. Terminology used herein to describe these methods includes:

1. Master Boundary Node: The end-node of an inter-zone link with, in one embodiment, a numerically lower node ID.
2. Slave Boundary Node: The end-node of an inter-zone link with, in one embodiment, a numerically higher node ID.
3. Entry Boundary Node: The boundary node that receives the Create-Path message from an adjacent zone.
4. Exit Boundary Node: The boundary node that forwards the Create-Path message to an adjacent zone.
5. Transit Zone: A zone that includes one or more tandem nodes used by a particular VP, but that neither originates nor terminates that VP.
6. Target Zone: The last zone specified in an inter-zone route.

Intra-Zone Failure Restoration

Restoration of failures in network 1400 can proceed in several different ways, depending on the route taken by the virtual path in question and the location of the failure. A failure affecting a virtual path routed within a single zone can therefore proceed according to a paradigm such as that previously outlined with regard to the restoration of virtual paths. Preferably, messages related to an intra-zone failure stay within that zone unless there are no resources within the zone to restore the failure. In such a case, one or more of the boundary nodes follow a procedure such as that described subsequently. A virtual path provisioned over a physical path 1475 that is completely within zone 1440, for example, from node 1410(5) to node 1410(6) through node 1410(7), that experiences a failure between nodes 1410(5) and 1410(7) can be restored by configuring a physical path 1480 between nodes 1410(5), 1410(4), and 1410(6), for example, as a result of using the previously-described method of restoration.

However, should the virtual path traverse one or more of the inter-zone links, the manner in which failures at various points along the virtual path are dealt with varies depending on where along the virtual path the failure occurs. For example, a virtual path provisioned over a physical path 1485 and starting again at node 1410(5), proceeding through nodes 1410(7), 1420(6), 1420(5), and 1420(4), and terminating at node 1420(1) may encounter a failure at one of several points. For this configuration, nodes 1410(7) and 1420(6) are the boundary nodes for their respective zones (zones 1440 and 1450, respectively). In certain failure scenarios, nodes 1420(6) and 1410(7) act as proxy nodes for their respective source/destination nodes (nodes 1410(5) and 1420(1), respectively) in order to restrict restoration efforts to the affected zone. Failures, however, can occur at any of the nodes along the path, or at one of the links along the path.

For example, the restoration operations for a failure on the intra-zone link between nodes 1410(5) and 1410(7) is preferably restricted to zone 1440. In this scenario, RPR packets are sent out by node 1410(5) and a new physical path is provisioned to restore the virtual path. The RPR packets need not go any further than node 1410(5) (unless there are insufficient resources within zone 1440) because node 1410(7) acts as a proxy for destination node 1420(1). By employing a proxy boundary node, the restoration process is limited to the zone in which the failure occurred and so the network overhead associated with sending RPR packets outside of zone 1440 is avoided. Thus, the restoration of the virtual path focuses on zone 1440, resulting in, for example, a new physical path 1490 from node 1410(5), through nodes 1410(4) and 1410(6) to node 1410(7). Assuming 1410(5) is the source node and that 1420(1) is the destination node, it can be seen that the same scenario for a failure in zone 1450 affecting the virtual path would follow a similar sequence. In that case, a new physical path supporting the original virtual path would be provisioned within zone 1450, with no effect on the overhead experienced by the nodes outside that zone (this being a result of node 1420(6) acting as a proxy for the source node (node 1410(5))).

Inter-Zone Failure Restoration

With regard to inter-zone failures (i.e., failures between zones occurring on inter-zone links, for example) or intra-zone failures requiring inter-zone resources for restoration, several approaches to failure restoration present themselves. As an initial matter, it will be noted that inter-zone restoration involves the boundary nodes of at least the zones containing the source and destination nodes. Boundary nodes, as noted, maintain a separate topological database for each of the zones to which they are attached.

The restoration of a virtual path through two boundary nodes is preferably accomplished by the following exemplary process. The boundary nodes begin by attempting to restore the failure using only other inter-zone links, and in particular, those inter-zone links shared by the two. If there are no acceptable inter-zone links shared by the two boundary nodes, the boundary nodes search for inter-zone links that are parallel to the failed link but terminate at different boundary nodes. In other words, the two boundary nodes employ links in the network's backbone zone to bridge the gap left by the failed link. If the attempt to restore the virtual circuit using other backbone links fails, the two boundary nodes then try to restore the virtual path by establishing an end-to-end physical path using the backbone zone and includes zones that must be traversed to establish a path between the source and destination nodes. An RPR is then sent to each zone to establish a route within that zone. Preferably, these new intra-zone routes are established concurrently in order to minimize the delay associated with restoration of the virtual path.

In one embodiment, a combination of broadcast and source-routed packets are used to restore inter-zone traffic affected by a failure in an inter-zone link or one of an inter-zone link's two end-nodes. The protocol uses information contained in the topology database of zone 0 (backbone zone) to compute new inter-zone routes for the failed VP's. Source routed packets are then used to request and establish the new routes (i.e., no flooding or broadcasting of packets is ever attempted, or allowed, between zones, only within zones). One of two nodes that share the failed inter-zone link is designated the master boundary node, and computes an alternate path for each failed route (e.g., using a shortest-path-first technique), inserts the alternate path into a Create-Path packet, and sends the Create-Path packet to the next node along the path. Tandem boundary nodes then use the computed route to forward the packet towards its ultimate destination. Routes within each zone are established using the same mechanism described previously. It is important to note that intra-zone restoration activities can occur in parallel and independent of each other, as this feature speeds the restoration process.

Figure 15:
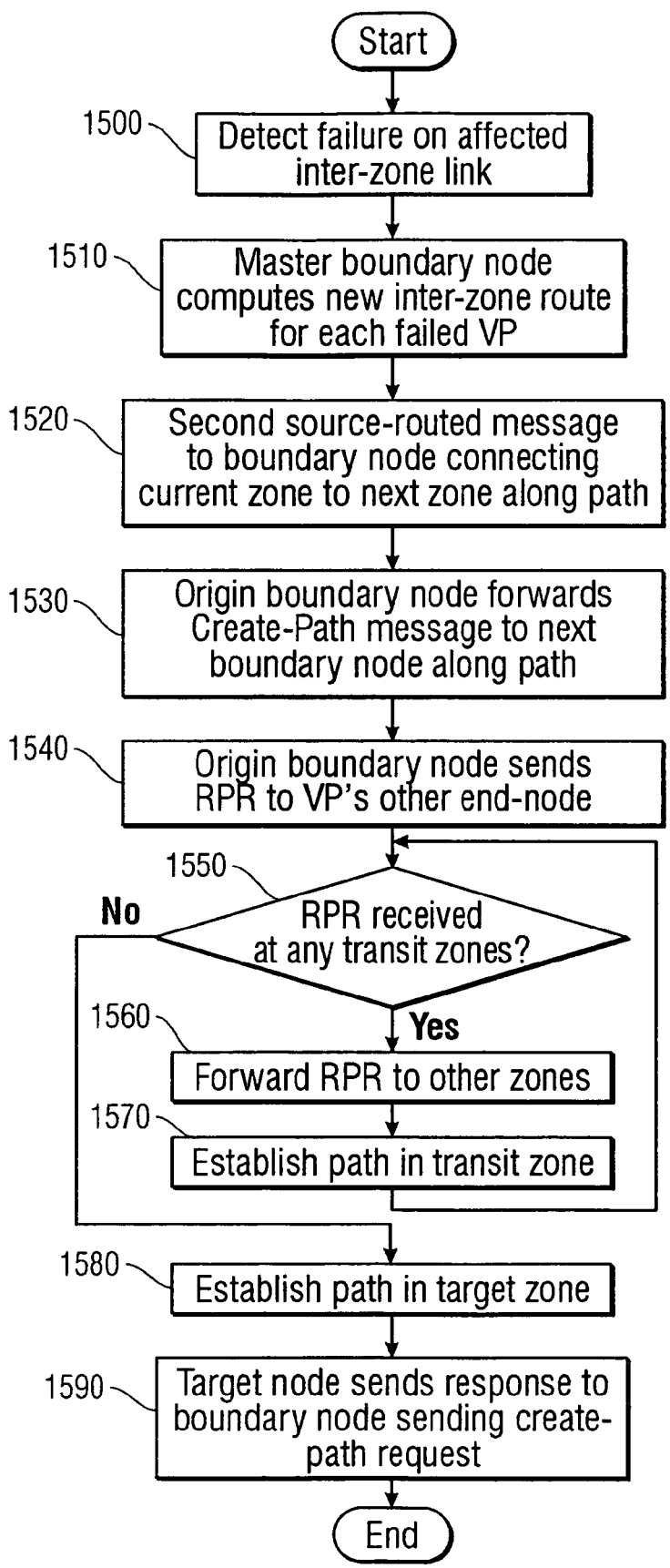
FIG. 15 is a flow diagram illustrating the actions performed in restoring an inter-zone failure.

FIG. 15 illustrates a method according to a network employing a zoned architecture. In this example, a virtual path (VP) is provisioned in network 1400 and has been assigned a physical path 1495 routed as follows (in terms of both node IDs and reference numerals): 1.6→1.1→2.2→2.3 (node 1410(6)→node 1410(1)→node 1420(2)→node 1420(3)). In the case of a failure on the link between nodes 1410(1)

and 1420(2), the following gives an example of one method of restoring the path that employs the zoned topology depicted in FIG. 14.

1. The two end-nodes of the failed inter-zone link, i.e., the boundary nodes (nodes 1410(1) and 1420(2)) detect the failure on inter-zone link 1470(1) and send one or more delete-path requests to all end-nodes affected by the failure (step 1500). An end-node is any node that terminates a VP within that zone, including proxy source and destination nodes. In this example, the two end nodes are nodes 1410(6) and 1420(3).
2. The master boundary node (node 1410(1), because its node ID of 1.1 is numerically lower than that of node 1420(2) (with a node ID of 2.2)) computes a new inter-zone route for each failed VP using the topology database for inter-zone link 1470(1), which is part of backbone zone 1465 (step 1510). The vertices of a graph of backbone zone 1465 represent entire zones (e.g., zones 1445, 1450, and 1460) interconnected by inter-zone links 1470(1)-(4). The master boundary node first tries to establish the route over inter-zone links that are parallel to the failed link (inter-zone link 1470(1)). If unsuccessful, which is the case in this example, the node then tries to establish the paths over links that traverse other zones (e.g., inter-zone link 1470(3)). A method of path selection, such as that described herein, is used in the latter case to select the shortest path (e.g., minimum-hop path) between the two zones. The resulting route for this example is [zone 1440→zone 1460→zone 1450].
3. A source-routed message is then sent to the boundary node that connects the current zone of the next zone along the path (step 1520), which would also be the target zone if a parallel link were found in step 2. That node is referred to herein as the origin boundary node, since that node is responsible for establishing the intra-zone leg of the overall path. The node is also referred to herein as a boundary tandem node since that node is responsible for forwarding the Create-Path message to the next tandem boundary node along the inter-zone path. In this example, this node is node 1410(3) and the next zone along the path is zone 1460.
4. The origin boundary node first forwards the Create-Path message to the next boundary node along the path (i.e., node 1430(1)) (step 1530). It will be noted that the zone information is contained in the path being carried in the message. The node ID of the adjacent boundary node is obtained from the associated neighbor data structure.
5. The origin boundary node then sends a restore-path request to the other end-node of the VP (node 1410(6) in this example) in order to establish an intra-zone path within its own zone (step 1540). The mechanism used to establish the intra-zone path can employ, for example, the methods described previously.
6. When the Create-Path message arrives at a transit zone (e.g. zone 1460) (step 1550), the message is forwarded in the manner described in step 1530 (step 1560). The entry boundary node, i.e., the node that receives the request from the boundary node of the previous zone (node 1430(1) in this example), then establishes a path for the VP within its own zone using the restoration method described previously (step 1570). The entry boundary node uses the exit boundary node (node 1430(5) in this example) as a target node for all restore-path requests.
7. When the message finally arrives at the entry boundary node of the target zone (node 1420(1) and zone 1450, respectively), the sequence described in step 1540 is followed to establish the requested paths (step 1580). The target node in this case is the actual end point of the VP (node 1420(3) in this example).
8. The target node then sends an appropriate response back to the boundary node from which the target node received the create-path request (step 1590). The response is propagated all the way back to the master boundary node, causing the nodes along the new path to allocate resources reserved during the outbound traversal of the Create-Path message and freeing all other resources reserved during that phase.

With regard to forwarding packets within the zone, when a protocol message arrives at the entry boundary node of a transit zone, that node is required to do two things:

1. Forward the Create-Path request to the next zone.
2. Use the previously-described restoration process to establish an intra-zone path for the specified VP.

Figure 16:
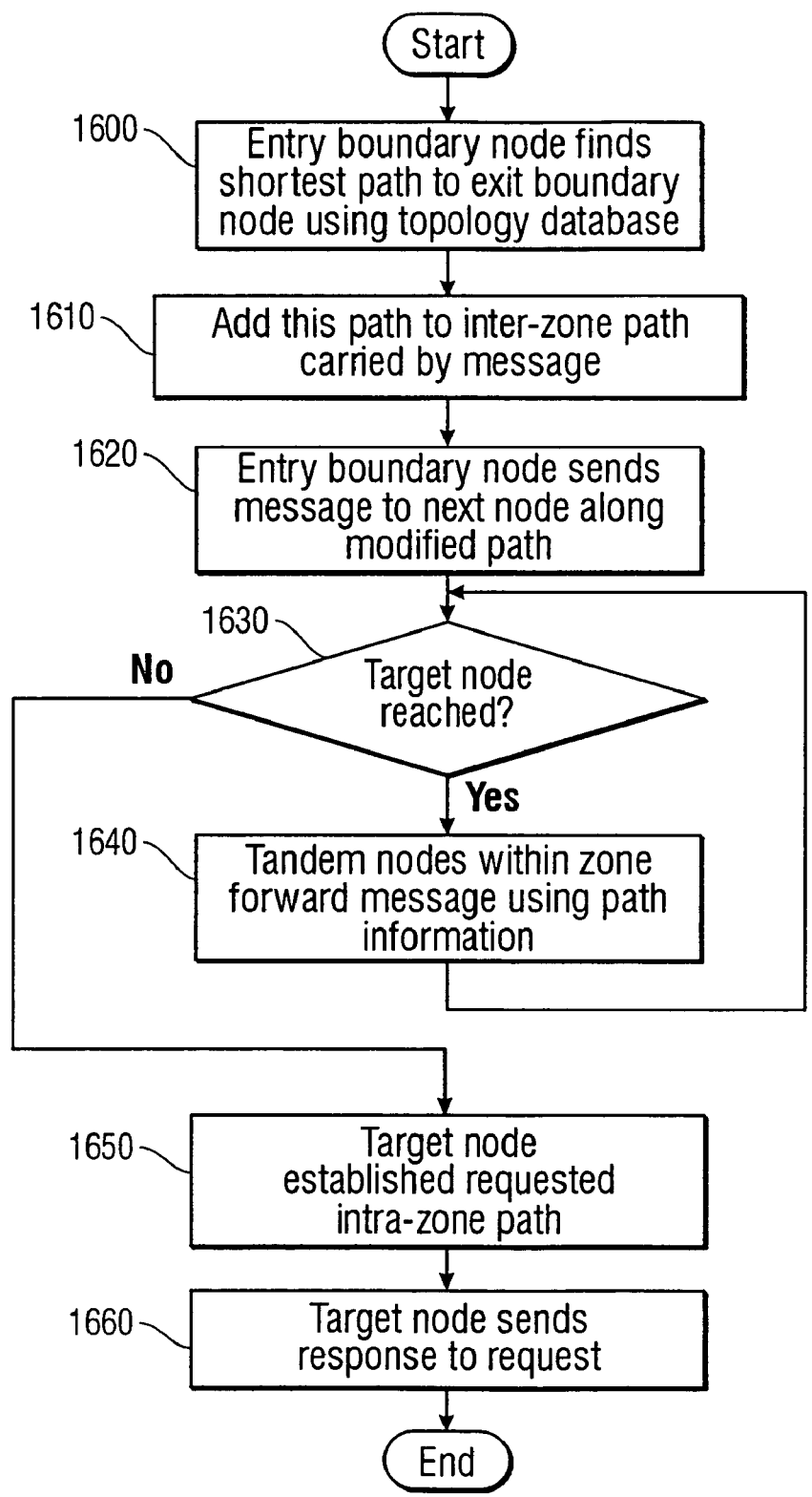
FIG. 16 is a flow diagram illustrating the actions performed by the nodes in a transit zone in restoring an inter-zone failure.

FIG. 16 illustrates the forwarding of Create-Path requests through a transit zone, in which the following steps are performed in one embodiment (again, please refer to zone 1460 of the network in FIG. 14 during the following discussion):

1. The entry boundary node (node 1430(1)) uses the topology database of its own zone (zone 1450) to find the shortest path P between self and the exit boundary node (node 1430(5)) (step 1600). In this example, P is [node 1430(3)→node 1430(5)].
2. The entry boundary node then moves the contents of the inter-zone path being carried in the message down by Length(P) positions, and adds P (step 1610). This emulates the function of a stack (a last-in, first-out, or LIFO, structure), where the last item "pushed" onto the stack is the first item taken out (popped off the stack). The resulting path (P) for this example is: [node 1430(3)→node 1430(5)→node 1430(2)].
3. The entry boundary node then sends the message to the next node along the modified path (node 1430(3) in this example) (step 1620).
4. Tandem nodes within the zone forward the message using information specified in its path, continues until the message finally reaches the exit boundary node (node 1430(5)), which also uses the next hop contained in its path to forward the message to the entry boundary node of the next zone (node 1420(1) and zone 1450, respectively) (steps 1630 and 1640).
5. When the message finally reaches an entry boundary node that is the target node of the request, this entry boundary node establishes the requested intra-zone path (step 1650) and sends an appropriate response (step 1660). The response follows the same path (both intra and inter-zone) specified in the request. It will be noted that new intra-zone paths are only computed when failures are detected within a given zone.

Another method of dealing with inter-zone failures is to use protection schemes such as diverse routing and rings. The use of such protection schemes for inter-zone links can be justified on at least two points:

1. Inter-zone links make up a very small percentage of the overall fiber capacity, and
2. The connectivity among zones may not be enough to make mesh restoration more efficient than other techniques.

The impact on reserve bandwidth such restoration schemes cause, while substantially more than that caused by a mesh topology and protocol such as that described herein, is more acceptable in such a case. This is because, in contrast to the 100% bandwidth penalty imposed on every link of a path in a network relying solely on such schemes, their limited use in linking zones restricts such undesirable characteristics to a minimum. It will be noted that the restoration techniques described herein are superior to protection schemes such as diverse routing and rings because of the 100% bandwidth penalty such protection schemes impose on every link of the overall path. In that case, a VP traversing multiple rings necessitates the reservation of an amount of protection bandwidth that is much higher than 100% of the VP's actual bandwidth. However, when connectivity is limited and the hop-count is low enough, the extra cost of such schemes can sometimes be justified in inter-zone communications applications.

Format and Usage of Protocol Messages

Protocol messages (or packets) preferably begin with a standard header to facilitate their processing. Such a header preferably contains the information necessary to determine the type, origin, destination, and identity of the packet. Normally, the header is then followed by some sort of command-specific data (e.g., zero or more bytes of information).

Such a header may include, for example, a request response indicator (RRI), a negative response indicator (NRI), a terminate/commit path indicator (TPI), a flush path indicator (FPI), a command field, a sequence number, an origin node ID (1670) and a target node ID. A description of these fields is provided below in Table 10. It will be noted that although the terms "origin" and "target" are used in describing header 1600, their counterparts (source and destination, respectively) can be used in their stead. Preferably, packets sent using a protocol according to the present invention employ a header layout such as that shown as header 1600. The header is then followed by zero or more bytes of command specific data.

TABLE 10

The layout of exemplary header 1600.

| | |
|---|---|
| R-bit | This bit indicates whether the packet is a request (0) or a response (1). The bit also known as the request/response indicator or RRI for short. |
| N-bit | This bit, which is only valid in response packets (RRI = 1), indicates whether response is positive (0) or negative (1). The bit is also known as the Negative Response Indicator or NRI. |
| T/C Bit | In a negative response (NRI = 1), this bit is referred to herein as a Terminate Path Indicator or TPI. When set, TPI indicates that the path along the receiving link should be terminated and never used again for this or any other instance of the corresponding request. The response also releases all bandwidth allocated for the request along all paths, and makes that bandwidth available for use by other requests. A negative response that has a "1" in its T-Bit is referred to herein as a Terminate response. Conversely, a negative response with a "0" in its T-Bit is referred to herein as a no-Terminate response.<br>In a positive response (NRI = 0), this bit indicates whether the specified path has been committed to by all nodes (1) or not (0). The purpose of a positive response that has a "0" in its C-Bit is to simply acknowledge the receipt of a particular request and to prevent the upstream neighbor from sending further copies of the request. Such a response is referred to herein as a no-Commit response. |
| F-bit | Flush Indicator. When set, this bit causes the resources allocated on the input link for the corresponding request to be freed, even if the received sequence number doesn't match the last one sent. However, the sequence number has to be valid, i.e., the sequence number should fall between FirstReceived and LastSent, inclusive. This bit also prevents the node from sending other copies of the failed request over the input link.<br>This bit is reserved and must be set to "0" in all positive responses (NRI = 0). |
| Command | This 4-bit field indicates the type of packet being carried with the header. |
| SequenceNumber | A node and VP unique number that, along with the node and VP IDs, helps identify specific instances of a particular command. |
| Origin | The node ID of the node that originated this packet. |
| Target | The node ID of the node that this packet is destined for. |

The protocol can be configured to use a number of different commands. For example, seven commands may be used with room in the header for 9 more. Table 11 lists those commands and provides a brief description of each, with detailed description of the individual commands following.

TABLE 11

Exemplary protocol commands.

| Command Name | Command Code | Description |
|---|---|---|
| INIT | 0 | Initialize Adjacency. |
| HELLO | 1 | Used to implement the Hello protocol (see Section 3 for more details). |
| RESTORE_PATH | 2 | Restore Virtual Path or VP. |
| DELETE_PATH | 3 | Delete and existing Virtual Path. |
| TEST_PATH | 4 | Test the specified Virtual Path. |
| LINK_DOWN | 5 | Used by slave nodes to inform their master(s) of local link failures. |
| CONFIGURE | 6 | Used by master notes to configure slave nodes. |

The Initialization Packet

An initialization packet causes a START event to be sent to the Hello State Machine of the receiving node and includes a node ID field, a link cost field, one or more QoS capacity fields (e.g., a QoS3 capacity (Q3C) field and a QoSn capacity (QnC) field), a Hello interval field, and a time-out interval field. The initialization (or INIT) packet is used by adjacent nodes to initialize and exchange adjacency parameters. The packet contains parameters that identify the neighbor, its link bandwidth (both total and available), and its configured Hello protocol parameters. The INIT packet is normally the first protocol packet exchanged by adjacent nodes. As noted previously, the successful receipt and processing of the INIT packet causes a START event to be sent to the Hello State machine. The field definitions appear in Table 12.

TABLE 12

Field definitions for an initialization packet.

| | |
|---|---|
| NodeID | Node ID of the sending node. |
| LinkCost | Cost of the link between the two neighbors. This may represent distance, delay or any other additive metric. |
| QoS3Capacity | Link bandwidth that has been reserved for QoS3 connection. |
| QoSnCapacity | Link bandwidth that is available for use by all QoS levels (0-3). |
| HelloInterval | The number of seconds between Hello packets. A zero in this field indicates that this parameter hasn't been configured on the sending node and that the neighbor should use its own configured interval. If both nodes send a zero in this field then the default value should be used. |
| HelloDeadInterval | The number of seconds the sending node will wait before declaring a silent neighbor down. A zero in this field indicates that this parameter hasn't been configured on the sending node and that the neighbor should use its own configured value. If both nodes send a zero in this field then the default value should be used. |

The Hello Packet

A Hello packet includes a node ID field, an LS count field, an advertising node field, a checksum field, an LSID field, a HOP_COUNT field, a neighbor count field, a neighbor node ID field, a link ID field, a link cost field, a Q3C field, and a QnC field. Hello packets are sent periodically by nodes in order to maintain neighbor relationships, and to acquire and propagate topology information throughout the network. The interval between Hello packets is agreed upon during adjacency initialization. Link state information is included in the packet in several situations, such as when the database at the sending nodes changes, either due to provisioning activity, port failure, or recent updates received from one or more originating nodes. Preferably, only modified LS entries are included in the advertisement. A null Hello packet, also sent periodically, is one that has a zero in its LSCount field and contains no LSAs. Furthermore, it should be noted that a QoSn VP is allowed to use any bandwidth reserved for QoS levels 0 through n. Table 13 describes the fields that appear first in the Hello packet. These fields appear only once.

TABLE 13

Field definitions for the first two fields of a Hello packet.

| | |
|---|---|
| NodeID | Node ID of the node that sent this packet, i.e. our neighbor. |
| LSCount | Number of link state advertisements contained in this packet. |

Table 14 describes information carried for each LSA and so is repeated LSCount times:

TABLE 14

Field definitions for information carried for each LSA.

| | |
|---|---|
| AdvertisingNode | The node that originated this link state entry. |
| Checksum | A checksum of the LSAs content, excluding fields that node's other than the originating node can alter. |
| LSID | Instance ID. This field is set to FIRST_LSID on the first instance of the LSA, and is incremented for every subsequent instance. |
| Hop_Count | This field is set to 0 by the originating node and is incremented at every hop of the flooding procedure. An LSA with a Hop_Count of MAX_HOPS is not propagated. LSAs with Hop_Counts equal to or greater than MAX_HOPS are silently discarded. |
| NeighborCount | Number of neighbors known to the originating node. This is also the number of neighbor entries contained in this advertisement. |

Table 15 describes information carried for each neighbor and so is repeated NeighborCount times:

TABLE 15

Field definitions for information carried for each neighbor.

| | |
|---|---|
| Neighbor | Node ID of the neighbor being described. |
| LinkCost | Cost metric for this link. This could represent distance, delay or any other metric. |
| QoS3Capacity | Link bandwidth reserved for the exclusive use of QoS3 connections. |
| QoSnCapacity | Link bandwidth available for use by all QoS levels (0-3). |

The GET_LSA Packet

A GET_LSA packet has its first byte set to zero, and includes an LSA count that indicates the number of LSAs being sought and a node ID list that reflects one or more of the node IDs for which an LSA is being sought. The node ID list includes node IDs. The GET_LSA response contains a mask that contains a "1" in each position for which the target node possesses an LSA. The low-order bit corresponds to the first node ID specified in the request, while the highest-order bit corresponds to the last possible node ID. The response is then followed by one or more Hello messages that contain the actual LSAs requested.

Table 16 provides the definitions for the fields shown in FIG. 19.

TABLE 16

Field definitions for a GET_LSA packet.

| | |
|---|---|
| Count | The number of node ID's contained in the packet. |
| NodeID0-NodeIDn | The node IDs for which the sender is seeking an LSA. Unused fields need not be included in the packet and should be ignored by the receiver. |

The Restore Path Packet

An RPR packet includes a virtual path identifier (VPID) field, a checksum field, a path length field, a HOP_COUNT field, and an array of path lengths. The path field may be further subdivided into hop fields, which may number up to MAX_HOPS hop fields. The Restore Path packet is sent by source nodes (or proxy boundary nodes), to obtain an end-to-end path for a VP. The packet is usually sent during failure recovery procedures but can also be used for provisioning new VPs. The node sending the RPR is referred to herein as the origin or source node. The node that terminates the request is referred to herein as the target or destination node. A restore path instance is uniquely identified by its origin and target nodes, and VP ID. Multiple copies of the same restore-path instance are identified by the unique sequence number assigned to each of them. Only the sequence number need be unique across multiple copies of the same instance of a restore-path packet. Table 17 provides the appropriate field definitions.

TABLE 17

Field definitions for a Restore Path packet.

| | |
|---|---|
| VPID | The ID of the VP being restored. |
| Checksum | The checksum of the complete contents of the RPR, not including the header. The checksum is normally computed by a target node and verified by the origin node. Tandem nodes are not required to verify or update this field. |
| PathLength | Set to MAX_HOPS on all requests: contains the length of the path (in hops, between the origin and target nodes). |
| PathIndex | Requests: Points to the next available entry in Path [ ]. Origin node sets the PathIndex to 0, and nodes along the path store the link ID of the input link in Path[ ] at PathIndex. PathIndex is then incremented to point to the next available entry in Path[ ]. Responses: Points to the entry in Path[ ] that corresponds to the link the packet was received on.. |
| Path[ ] | An array of PathLength link IDs that represent the path between the origin and target nodes. |

The Create Path Packet

A CREATE_PATH (CP) packet includes a virtual path identifier (VPID) field, a checksum field, a path length field, a HOP_COUNT field, and an array of path lengths. The path field may be further subdivided into hop fields, which may number up to MAX_HOPS. The CP packet is sent by source nodes (or proxy boundary nodes), to obtain an end-to-end path for a VP. The node sending the CP is referred to herein as the origin or source node. The node that terminates the request is referred to herein as the target or destination node. A CP instance is uniquely identified by its origin and target nodes, and VP ID. Multiple copies of the same CP instance are identified by the unique sequence number assigned to each of them. Only the sequence number need be unique across multiple copies of the same instance of a restore-path packet. Table 18 provides the appropriate field definitions.

TABLE 18

Field definitions for a Create Path packet.

| | |
|---|---|
| VPID | The ID of the VP being provisioned. |
| Checksum | The checksum of the complete contents of the CP, not including the header. The checksum is normally computed by a target node and verified by the origin node. Tandem nodes are not required to verify or update this field. |
| PathLength | Set to MAX_HOPS on all requests: contains the length of the path (in hops, between the origin and target nodes). |
| PathIndex | Requests: Points to the next available entry in Path[ ]. Origin node sets PathIndex to 0, and nodes along the path store the link ID of the input link in Path[ ] at PathIndex. PathIndex is then incremented to point to the next available entry in Path[ ]. Responses: Points to the entry in Path[ ] that corresponds to the link the packet was received on.. |
| Path[ ] | An array of PathLength link IDs that represent the path between the origin and target nodes. |

The Delete Path Packet

The Delete Path packet is used to delete an existing path and releases all of the path's allocated link resources. The Delete Path packet can use the same packet format as the Restore Path packet. The origin node is responsible for initializing the Path [ ], PathLength, and Checksum fields to the packet, which should include the full path of the VP being deleted, and also sets PathIndex to zero. Tandem nodes should release link resources allocated for the VP after they have received a valid response from the target node. The target node should set the PathIndex field to zero prior to computing the checksum of packet.

The TestPath Packet

The Test Path packet is used to test the integrity of an existing virtual path, and uses the same packet format as the RestorePath packet. The originating node is responsible for initializing the Path [ ], PathLength, and Checksum fields of the packet, which should include the full path of the span being tested. The target node also sets PathIndex to zero. The target node should set the PathIndex field to zero prior to computing the checksum of packet. The Test Path packet may be configured to test functionality, or may test a path based on criteria chosen by the user, such as latency, error rate, and the like.

The Link-Down Packet

The Link-Down packet is used when master nodes are present in the network, and is used by slave nodes to inform the master node of link failures. This message is provided for instances in which the alarms associated with such failures (AIS and RDI) do not reach the master node.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
    detecting a failure in a virtual circuit, wherein
        said virtual circuit comprises a physical circuit between a first end node and a first boundary node,
        said first boundary node is configured to couple a first zone of a network and a second zone of said network, wherein
        said network comprises a plurality of network nodes,
        said first zone comprises
            a first plurality of said network nodes, comprising said first end node and said first boundary node, and
            a first plurality of intra-zone links, wherein each one of said first plurality of said network nodes is coupled to at least one other of said first plurality of said network nodes by at least one of said first plurality of intra-zone links, and
        said second zone comprises
            a second boundary node, and
            a second end node of said virtual circuit,
        said first boundary node is configured to couple said first zone and said second zone by virtue of being configured to be coupled to said second boundary node by an inter-zone link,
        said first boundary node is configured to maintain topological data,
        said topological data comprises information regarding said first plurality of said network nodes and said first plurality of intra-zone links, and said topological data excludes topological information regarding intra-zone links in said second zone;
determining that said failure is within said physical circuit; and
determining an alternate physical circuit between said first end node and said first boundary node, wherein said determining said alternate physical circuit comprises
transmitting a plurality of restoration messages among nodes in said first zone, wherein
said transmitting is restricted to said first zone, and
said transmitting is performed in response to said determining that said failure is within said physical circuit, and
identifying said alternate physical circuit in response to at least one reply to said plurality of restoration messages, wherein
said identifying is performed by at least one of said network nodes.

2. The method of claim 1 wherein
said second zone comprises
a second plurality of said network nodes, and
a second plurality of intra-zone links, wherein
each one of said second plurality of said network nodes is coupled to at least one other of said second plurality of said network nodes by at least one of said second plurality of intra-zone links, and
said second plurality of said network nodes comprises said second end node and a second boundary node.

3. The method of claim 2, wherein said detecting comprises:
receiving a restoration message at said first boundary node on behalf of said second end node.

4. The method of claim 3, wherein said receiving comprises:
receiving an alarm indication signal at said first boundary node.

5. The method of claim 2, comprising:
allocating a partial physical circuit between said first end node and said first boundary node.

6. The method of claim 1, comprising:
communicating between said first and second zones prior to said failure using a first inter-zone link between said first and second zones; and
communicating between said first and second zones after said failure using said first inter-zone link.

7. The method of claim 1, wherein said determining said alternate physical circuit comprises:
generating a plurality of restoration messages in said first zone, wherein said determining said alternate physical circuit avoids transmission of said restoration messages out of said first zone through said boundary node.

8. The method of claim 1, comprising:
communicatively coupling said first zone and said second zone, wherein said detecting occurs after said coupling said first zone and said second zone.

9. An apparatus comprising:
means for detecting a failure in a virtual circuit, wherein
said virtual circuit comprises a physical circuit between a first end node and a first boundary node,
said first boundary node is configured to couple a first zone of a network and a second zone of said network, wherein
said first zone comprises
a first plurality of network nodes, comprising said first end node and said first boundary node, and
a first plurality of intra-zone links wherein each one of said first plurality of network nodes is coupled to at least one other of said first plurality of network nodes by at least one of said first plurality of intra-zone links, and
said second zone comprises
a second boundary node, and
a second end node of said virtual circuit,
said first boundary node is configured to couple said first zone and said second zone by virtue of being configured to be coupled to said second boundary node by an inter-zone link,
said first boundary node is configured to maintain topological data,
said topological data comprises information regarding said first plurality of network nodes and said first plurality of intra-zone links, and
said topological data excludes topological information regarding intra-zone links in said second zone;
means for determining that said failure is within said physical circuit; and
means for determining an alternate physical circuit between said first end node and said first boundary node, wherein said means for determining said alternate physical circuit comprises
means for transmitting a plurality of restoration messages among nodes in said first zone, wherein
said transmitting is restricted to said first zone, and
said transmitting is performed in response to said detecting, and
means for identifying said alternate physical circuit in response to at least one reply to said plurality of restoration messages.

10. The apparatus of claim 9, wherein
said second zone comprises
a second plurality of network nodes, and
a second plurality of intra-zone links, wherein
each one of said second plurality of network nodes is coupled to at least one other of said second plurality of network nodes by at least one of said second plurality of intra-zone links, and
said second plurality of network nodes comprises said second end node and a second boundary node; and
said first boundary node is coupled to said second boundary node by an inter-zone link.

11. The apparatus of claim 10, wherein said means for detecting comprises:
means for receiving a restoration message at said first boundary node on behalf of said second end node.

12. The apparatus of claim 11, wherein said means for receiving comprises:
means for receiving an alarm indication signal at said first boundary node.

13. The apparatus of claim 10, comprising:
means for allocating a partial physical circuit between said first end node and said first boundary node.

14. The apparatus of claim 9, comprising:
means for communicating between said first and second zones prior to said failure using a first inter-zone link between said first and second zones; and
means for communicating between said first and second zones after said failure using said first inter-zone link.

15. The apparatus of claim 9, wherein:
said means for determining said alternate physical circuit comprises
means for generating a plurality of restoration messages in said first zone; and
said first boundary node comprises means for avoiding transmission of said restoration messages out of said first zone.

16. A network comprising:
a first zone comprising
a first end node of a virtual circuit,
a first boundary node, wherein
said virtual circuit comprises a physical circuit between said first end node and said first boundary node,
a first plurality of network nodes, comprising said first end node and said first boundary node, and
a first plurality of intra-zone links, wherein each one of said first plurality of network nodes is coupled to at least one other of said first plurality of network nodes by at least one of said first plurality of intra-zone links; and
a second zone comprising
a second boundary node, and
a second end node of said virtual circuit;
wherein said first boundary node is configured to
communicatively couple said first zone and said second zone, by virtue of being configured to be coupled to said second boundary node by an inter-zone link,
maintain topological data, wherein
said topological data comprises information regarding said first plurality of network nodes and said first plurality of intra-zone links, and
said topological data excludes topological information regarding intra-zone links in said second zone,
transmit, in response to a failure within said physical circuit, a plurality of restoration messages among nodes in said first zone, wherein said restoration messages are restricted to said first zone, and
determine, in response to at least one reply to said plurality of restoration messages, an alternate physical circuit between said first end node and said first boundary node.

17. The network of claim 16, wherein
said second zone comprises
a second plurality of network nodes, and
a second plurality of intra-zone links, wherein
each one of said second plurality of network nodes is coupled to at least one other of said second plurality of network nodes by at least one of said second plurality of intra-zone links, and
said second plurality of network nodes comprises said second end node and a second boundary node; and
said first boundary node is coupled to said second boundary node by an inter-zone link.

18. An apparatus comprising:
a communications port configured to be coupled to a network; and
a processor coupled to said communications port and configured to detect a failure in a virtual circuit, wherein
said virtual circuit comprises a physical circuit between a first end node and a first boundary node,
said first boundary node is configured to couple a first zone of said network to a second zone of said network,
said first zone comprises
a first plurality of network nodes, comprising said first end node and said first boundary node, and
a first plurality of intra-zone links, wherein each one of said first plurality of network nodes is coupled to at least one other of said first plurality of network nodes by at least one of said first plurality of intra-zone links, and
said second zone comprises
a second boundary node, and
a second end node of said virtual circuit,
said first boundary node is configured to couple said first zone and said second zone by virtue of being configured to be coupled to said second boundary node by an inter-zone link,
said first boundary node is configured to maintain topological data,
said topological data comprises information regarding said first plurality of network nodes and said first plurality of intra-zone links, and
said topological data excludes topological information regarding intra-zone links in said second zone,
cause said communications port to transmit a plurality of restoration messages among nodes in said first zone, wherein
said restoration messages are restricted to said first zone, and
said restoration messages are transmitted in response to said failure, and
identify, in response to at least one reply to said plurality of restoration messages, an alternate physical circuit between said first end node and said first boundary node.

19. The apparatus of claim 18, wherein:
said second zone comprises
a second plurality of network nodes, and
a second plurality of intra-zone links,
each one of said second plurality of network nodes is coupled to at least one other of said second plurality of network nodes by at least one of said second plurality of intra-zone links,
said second plurality of network nodes comprises said second end node and a second boundary node,
said intra-zone network topology information comprises information regarding said first plurality of network nodes and said first plurality of intra-zone links, and
said extra-zone network topology information comprises information regarding said second plurality of network nodes and said second plurality of intra-zone links.

20. The apparatus of claim 18, wherein said restoration messages are configured to avoid transmission of said restoration messages out of said first zone through said boundary node.

* * * * *

UNITED STATES PATENT AND TRADEMARK OFFICE
CERTIFICATE OF CORRECTION

PATENT NO. : 7,724,655 B2  Page 1 of 1
APPLICATION NO. : 10/958901
DATED : May 25, 2010
INVENTOR(S) : Ali Najib Saleh and Stevan E. Plote It is certified that error appears in the above-identified patent and that said Letters Patent is hereby corrected as shown below:

Title Page, Item (73) Assignee:

Should read as follows:

Cisco Technology, Inc.
San Jose, CA (US)

Title Page, please insert field (63) Related U.S. Application

Data as follows:

--Related U.S. Application Data

(63) Continuation of application No. 09/389,302, filed on 9/02/1999, now PAT No. 6,801,496, which (a) is a CIP of application No. 09/232,397, filed on 1/15/1999, now PAT No. 6,856,627, and (b) claims benefit of provisional application No. 60/137,472, filed on 6/04/1999.--.

Signed and Sealed this

Twenty-ninth Day of June, 2010

David J. Kappos
*Director of the United States Patent and Trademark Office*